(12) United States Patent
Onishi et al.

(10) Patent No.: US 7,995,170 B2
(45) Date of Patent: Aug. 9, 2011

(54) LIQUID CRYSTAL DISPLAY DEVICE

(75) Inventors: Noriaki Onishi, Nara (JP); Kazuhiko Tamai, Nabari (JP); Takaaki Okamoto, Kizugawa (JP); Nobukazu Nagae, Suwa (JP)

(73) Assignee: Sharp Kabushiki Kaisha, Osaka (JP)

( * ) Notice: Subject to any disclaimer, the term of this patent is extended or adjusted under 35 U.S.C. 154(b) by 326 days.

(21) Appl. No.: 11/886,782

(22) PCT Filed: Mar. 20, 2006

(86) PCT No.: PCT/JP2006/305567
§ 371 (c)(1),
(2), (4) Date: Oct. 30, 2008

(87) PCT Pub. No.: WO2006/101083
PCT Pub. Date: Sep. 28, 2006

(65) Prior Publication Data
US 2009/0161049 A1 Jun. 25, 2009

(30) Foreign Application Priority Data

Mar. 23, 2005 (JP) ................................. 2005-084934
Sep. 8, 2005 (JP) ................................. 2005-261217

(51) Int. Cl.
*G02F 1/1335* (2006.01)
*G02F 1/1337* (2006.01)

(52) U.S. Cl. ........ 349/114; 349/110; 349/113; 349/117; 349/129

(58) Field of Classification Search .................. 349/110, 349/113, 114, 117, 129, 128, 119, 130
See application file for complete search history.

(56) References Cited

U.S. PATENT DOCUMENTS

| 5,408,345 A | 4/1995 | Mitsui et al. |
| 5,666,179 A | 9/1997 | Koma |

(Continued)

FOREIGN PATENT DOCUMENTS

JP 6-75238 3/1994

(Continued)

OTHER PUBLICATIONS

International Search Report for PCT/JP2006/305567 mailed Jun. 13, 2006.

(Continued)

*Primary Examiner* — David Nelms
*Assistant Examiner* — Tai Duong
(74) *Attorney, Agent, or Firm* — Nixon & Vanderhye P.C.

(57) ABSTRACT

In a liquid crystal display apparatus in which a liquid crystal domain having radially tilted orientation is formed in a pixel, high-quality reflection display with occurrence of an afterimage being suppressed is attained. The liquid crystal display apparatus of this invention includes a first substrate 110a, a second substrate 110b and a vertically aligned liquid crystal layer 120 placed therebetween, and has pixels each including a first electrode 111, a second electrode 131 and a liquid crystal layer located therebetween. The first substrate includes a reflection layer 116 having a concave/convex surface and an insulating layer 117 formed to cover the reflection layer. The first electrode 111 is placed on the insulating layer 117 and has a shape defined to exert alignment regulating force with which at least one liquid crystal domain having radially tilted orientation is formed in the liquid crystal layer in a voltage applied state. The second substrate 110b has a protrusion 125 protruding toward the liquid crystal layer in a region corresponding to the liquid crystal domain.

10 Claims, 13 Drawing Sheets

U.S. PATENT DOCUMENTS

| | | |
|---|---|---|
| 6,195,140 B1 | 2/2001 | Kubo et al. |
| 6,384,889 B1 | 5/2002 | Miyachi et al. |
| 6,753,939 B2 | 6/2004 | Jisaki et al. |
| 6,788,375 B2 | 9/2004 | Ogishima et al. |
| 2005/0030453 A1 | 2/2005 | Maeda |
| 2005/0128396 A1* | 6/2005 | Tsuchiya et al. ............ 349/123 |

FOREIGN PATENT DOCUMENTS

| | | |
|---|---|---|
| JP | 6-301036 | 10/1994 |
| JP | 9-90426 | 4/1997 |
| JP | 2955277 | 7/1999 |
| JP | 2000-47217 | 2/2000 |
| JP | 2002-350853 | 12/2002 |
| JP | 2003-167253 | 6/2003 |
| JP | 2003-315803 | 11/2003 |
| JP | 2004-206080 | 7/2004 |
| JP | 2005-18028 | 1/2005 |

OTHER PUBLICATIONS

English translation of the International Preliminary Report on Patentability mailed Oct. 4, 2007 in corresponding PCT Application No. PCT/JP2006/305567.

* cited by examiner (a)

(b)

(a)

(b)

(c)

(a)

(b)

(a)

TRANSMISSION REGION | REFLECTION REGION (b)

TRANSMISSION REGION | REFLECTION REGION (a)

SUB-PIXEL (b)

(a)

(b)

(a)

← TRANSMISSION REGION → ← REFLECTION REGION →

(b)

(a)

← TRANSMISSION REGION → ← REFLECTION REGION →

(b)

(a)

TRANSMISSION REGION ⟷ REFLECTION REGION (b)

LIQUID CRYSTAL DISPLAY DEVICE

This application is the U.S. national phase of International Application No. PCT/JP2006/305567, filed 20 Mar. 2006, which designated the U.S. and claims priority to Japanese Patent Application Nos. 2005-084934, filed 23 Mar. 2005, and 2005-261217, filed 8 Sep. 2005, the entire contents of each of which are hereby incorporated by reference.

TECHNICAL FIELD

The present invention relates to a liquid crystal display apparatus, and more particularly, to a liquid crystal display apparatus suitably used in portable information terminals (e.g., PDAs), mobile phones, car-mounted liquid crystal displays, digital cameras, personal computers, amusement equipment, TV sets and the like.

BACKGROUND ART

In recent years, taking advantage of their features of being thin and consuming low power, liquid crystal display apparatuses have found widespread use in notebook personal computers, mobile phones, information equipment such as electronic personal organizers, camera-integrated VTRs equipped with a liquid crystal monitor and the like.

As a display mode capable of attaining high contrast and a wide viewing angle, a vertical alignment mode using a vertically aligned liquid crystal layer has received attention. A vertically aligned liquid crystal layer is generally formed using a vertical alignment film and a liquid crystal material negative in dielectric anisotropy.

For example, Patent Literature 1 discloses a liquid crystal display apparatus in which an oblique electric field is generated at the periphery of an opening provided on a counter electrode facing a pixel electrode via a liquid crystal layer, to tilt liquid crystal molecules located around liquid crystal molecules that are in a vertically aligned state inside the opening, to thereby improve the viewing angle characteristic.

Patent Literature 1 described above has a problem that with the disclosed configuration it is difficult to generate oblique electric fields over the entire region of a pixel and as a result liquid crystal molecules may delay in response to the voltage in some portion of the pixel causing a problem of occurrence of an afterimage phenomenon.

To solve the above problem, Patent Literature 2 discloses a liquid crystal display apparatus in which openings are arranged regularly in a pixel electrode or a counter electrode to give a plurality of liquid crystal domains exhibiting radially tilted orientation in a pixel.

Patent Literature 3 discloses a technology in which a plurality of protrusions are provided regularly in a pixel to stabilize the aligned state of liquid crystal domains having radially tilted orientation that emerge around each protrusion as the center. This literature also discloses that the display characteristics can be improved by regulating the alignment of liquid crystal molecules using oblique electric fields generated with openings provided in an electrode, together with alignment regulating force of the protrusions.

In recent years, a liquid crystal display apparatus capable of presenting high-quality display both indoors and outdoors has been proposed (see Patent Literature 4 and Patent Literature 5, for example). Such a liquid crystal display apparatus, called a transflective liquid crystal display apparatus, has a reflection region meant for display in a reflection mode and a transmission region meant for display in a transmission mode, in each pixel.

Patent Literature 6 and Patent Literature 7 disclose a technology in which a reflection electrode having a concave/convex surface is used to attain a reflection display characteristic close to paper white. Such a reflection electrode having a concave/convex surface is obtained by patterning a photosensitive resin layer by photolithography, deforming the photosensitive resin layer by heating and forming a reflection electrode on a concave/convex surface of the resultant resin layer.

Currently commercially available transflective liquid crystal display apparatuses adopt the ECB mode, the TN mode and the like. Patent Literature 3 described above also discloses a configuration applying the vertical alignment mode, not only to transmissive liquid crystal display apparatuses, but also to transflective liquid crystal display apparatuses. Also, Patent Literature 8 discloses a technology in which, in a transflective liquid crystal display apparatus having a vertically aligned liquid crystal layer, the alignment (multi-axis alignment) of liquid crystal molecules is controlled with a depression that is formed on an insulating layer to make the thickness of the liquid crystal layer in a transmission region double that of the liquid crystal layer in a reflection region. This patent literature discloses a configuration in which the depression has a shape of a regular octagon, for example, and a protrusion (convex portion) or a slit (electrode opening) is formed at a position facing the depression via the liquid crystal layer (see FIGS. 4 and 16 of Patent Literature 8, for example).

Patent Literature 9 discloses a technology in which protrusions are formed on a substrate to attain radially tilted orientation of liquid crystal molecules in liquid crystal domains. This literature argues that the radially tilted orientation is stabilized, in a voltage applied state, with an alignment regulating structure provided on one substrate and the effect of the protrusions on the side of the other substrate facing a liquid crystal layer.

Patent Literature 1: Japanese Laid-Open Patent Publication No. 6-301036
Patent Literature 2: Japanese Laid-Open Patent Publication No. 2000-47217
Patent Literature 3: Japanese Laid-Open Patent Publication No. 2003-167253
Patent Literature 4: Japanese Patent Gazette No. 2955277
Patent Literature 5: U.S. Pat. No. 6,195,140
Patent Literature 6: Japanese Laid-Open Patent Publication No. 6-75238
Patent Literature 7: Japanese Laid-Open Patent Publication No. 9-90426
Patent Literature 8: Japanese Laid-Open Patent Publication No. 2002-350853
Patent Literature 9: Japanese Laid-Open Patent Publication No. 2003-315803

DISCLOSURE OF INVENTION

Problems to be Solved by the Invention

As described above, the reflection electrodes disclosed in Patent Literature 6 and Patent Literature 7 have minute concave/convex portions on the surfaces thereof to reflect incident light over a predetermined angle range. According to examinations performed by the present inventors, however, it has been found that a transient afterimage will occur if such a reflection electrode having a concave/convex surface is applied to a liquid crystal display apparatus having a vertically aligned liquid crystal layer.

In a vertically aligned liquid crystal display apparatus that forms radially tilted domains during voltage application, vertical alignment films are not rubbed, but oblique electric fields generated during voltage application and alignment regulating force of protrusions and the like provided on the side of a substrate facing a liquid crystal layer are used to form radially tilted domains. If concave/convex portions exist on the surface of a reflection electrode, the concave/convex portions also act to regulate the aligned direction of liquid crystal molecules (direction in which liquid crystal molecules fall during voltage application), resulting in formation of a number of minute liquid crystal domains in a pixel. As the voltage application continues, such minute liquid crystal domains are fused into a target radially tilted domain formed under the oblique electric fields and the alignment regulating force of the protrusions and the like, to form one stable liquid crystal domain. This process of a number of minute domains being fused into a target radially tilted domain normally requires two to three seconds. Since the distribution of aligned directions (e.g., azimuth angles) of liquid crystal molecules in minute domains is different from that of liquid crystal molecules in the radially tilted domain, the brightness appears different when observed in a slant direction. The process of fusion of a number of minute domains is therefore recognized as a transient afterimage.

In view of the above problems, an object of the present invention is providing a liquid crystal display apparatus forming a liquid crystal domain having radially tilted orientation in a pixel, in which high-quality reflection display suppressing occurrence of an afterimage is attained.

Means for Solving the Problems

The liquid crystal display apparatus of the present invention includes a first substrate, a second substrate placed to face the first substrate and a vertically aligned liquid crystal layer placed between the first and second substrates, wherein the liquid crystal display apparatus includes a plurality of pixels each including a first electrode formed on the first substrate, a second electrode formed on the second substrate and the liquid crystal layer located between the first and second electrodes, the first substrate further includes a reflection layer having a concave/convex surface and an insulating layer formed to cover the reflection layer, the first electrode being placed on the insulating layer and having a shape defined to exert alignment regulating force with which at least one liquid crystal domain having radially tilted orientation is formed in the liquid crystal layer in a voltage applied state, and the second substrate has a protrusion protruding toward the liquid crystal layer in a region corresponding to the liquid crystal domain.

In an embodiment, the first electrode has an opening or a cut portion.

In another embodiment, the insulating layer is transparent.

In yet another embodiment, the first electrode is made of a transparent conductive layer.

In yet another embodiment, each of the plurality of pixels has a transmission region adapted to display in a transparent mode and a reflection region adapted to display in a reflection mode, the reflection region includes a region in which the first electrode overlaps the reflection layer, and the transmission region includes a region in which the first electrode does not overlap the reflection layer, and each of the transmission region and the reflection region includes at least one liquid crystal domain having radially tilted orientation in a voltage applied state.

In yet another embodiment, the thickness dt of the liquid crystal layer in the transmission region is greater than the thickness dr of the liquid crystal layer in the reflection region.

In yet another embodiment, the second substrate further includes a light-shading layer placed on the side of the protrusion away from the liquid crystal layer, the protrusion being placed in a region corresponding to the liquid crystal domain in the transmission region.

In yet another embodiment, the light-shading layer shades the entire of the protrusion when viewed in a direction vertical to the second substrate.

In yet another embodiment, the second substrate has a color filter layer and a black matrix, and the light-shading layer is formed of the same film as the black matrix.

In yet another embodiment, the first substrate further includes an active element provided to correspond to each of the plurality of pixels, and the first electrode is a pixel electrode provided for each of the plurality of pixels and connected to the active element.

In yet another embodiment, the liquid crystal display apparatus further includes: a pair of polarizing plates placed to face each other via the first and second substrates; and at least one biaxial phase plate between the first substrate and/or the second substrate and the pair of polarizing plates.

In yet another embodiment, the liquid crystal display apparatus further includes: a pair of polarizing plates placed to face each other via the first and second substrates; and at least one uniaxial phase plate between the first substrate and/or the second substrate and the pair of polarizing plates.

Effect of the Invention

In the liquid crystal display apparatus of the present invention, the first electrode (pixel electrode, for example) formed on the first substrate has a shape defined to exert alignment regulating force with which a liquid crystal domain having radially tilted orientation is formed in the liquid crystal layer in a voltage applied state. The second substrate placed to face the first substrate has a protrusion protruding toward the liquid crystal layer in a region corresponding to the liquid crystal domain. The reflection layer having a concave/convex surface is covered with an insulating layer (also called a flattening layer), and the first electrode is placed on the insulating layer (on the surface thereof facing the liquid crystal layer). Thus, with the surface facing the liquid crystal layer being flattened with the insulating layer, orientation of liquid crystal molecules is not disturbed, and stable radially tilted orientation can be obtained with oblique electric fields generated with the first electrode and the alignment regulating force of the protrusion placed on the second substrate. It goes without mentioning that an excellent reflection characteristic is exhibited with the concave/convex surface of the reflection layer.

According to the present invention, the display quality in the reflection mode can be improved in reflective liquid crystal display apparatuses and in transflective liquid crystal display apparatuses adapted to both transmission mode display and reflection mode display.

BRIEF DESCRIPTION OF DRAWINGS

FIGS. 1(a)-(b) are schematic views including FIGS. 1(a)-1(b) illustrating the operation principle of a liquid crystal display apparatus of an embodiment of the present invention, in which FIG. 1(a) shows the state during non-voltage application and FIG. 1(b) shows the state during voltage application.

FIGS. 3(a)-(c) are views diagrammatically showing alignment of liquid crystal molecules in a sub-pixel of a liquid crystal display apparatus 10R including a reflection electrode having a concave/convex surface, in which FIG. 3(a) shows the state during non-voltage application, FIG. 3(b) shows the state immediately after voltage application, and FIG. 3(c) shows the state after a lapse of a sufficient time from voltage application.

FIGS. 4(a)-(b) are views diagrammatically showing alignment of liquid crystal molecules in a sub-pixel of a liquid crystal display apparatus 10 of an embodiment of the present invention, in which FIG. 4(a) shows the state during non-voltage application and FIG. 4(b) shows the state during voltage application.

FIGS. 7(a)-(b) are views diagrammatically showing a configuration of one pixel of a reflective liquid crystal display apparatus 100 of an embodiment of the present invention, in which FIG. 7(a) is a plan view and FIG. 7(b) is a cross-sectional view.

FIGS. 8(a)-(b) are views diagrammatically showing a configuration of one pixel of a transflective liquid crystal display apparatus 200 of an embodiment of the present invention, in which FIG. 8(a) is a plan view and FIG. 8(b) is a cross-sectional view.

FIGS. 9(a)-(b) are views diagrammatically showing a configuration of one pixel of a liquid crystal display apparatus 300 of Example 1, in which FIG. 9(a) is a plan view and FIG. 9(b) is a cross-sectional view.

FIGS. 10(a)-(b) are views showing the display characteristics of the liquid crystal display apparatus 300 of Example 1, in which FIG. 10(a) is a voltage-transmittance characteristic view and FIG. 10(b) is an iso-contrast characteristic view.

FIGS. 11(a)-(b) are views diagrammatically showing a configuration of one pixel of a liquid crystal display apparatus 400 of Example 2, in which FIG. 11(a) is a plan view and FIG. 11(b) is a cross-sectional view.

FIGS. 14(a)-(b) are views diagrammatically showing a configuration of one pixel of a liquid crystal display apparatus 500A of Example 3, in which FIG. 14(a) is a plan view and FIG. 14(b) is a cross-sectional view.

FIGS. 15(a)-(b) are views diagrammatically showing a configuration of one pixel of a liquid crystal display apparatus 500B of Example 3, in which FIG. 15(a) is a plan view and FIG. 15(b) is a cross-sectional view.

DESCRIPTION OF REFERENCE NUMERALS

Figure 1:
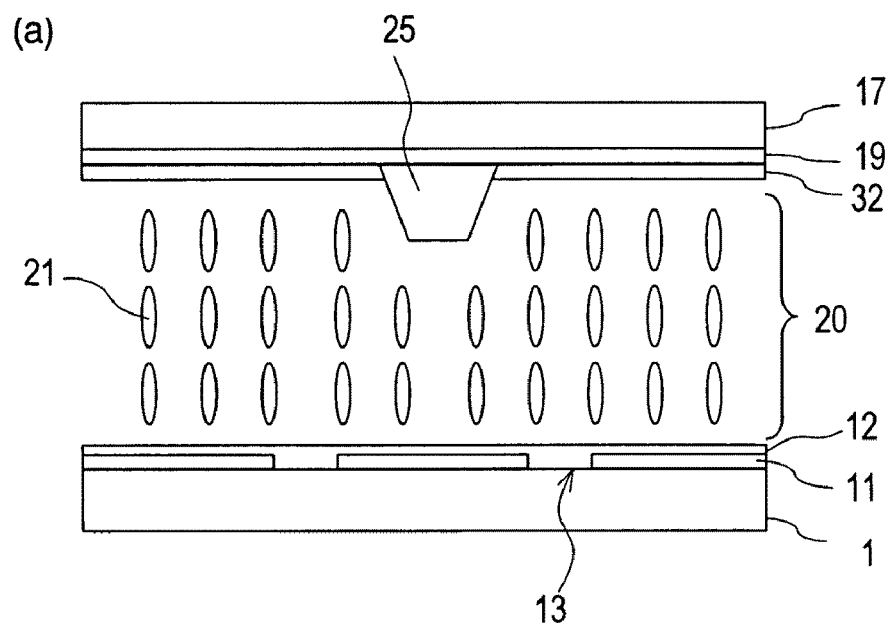
Figure 1:
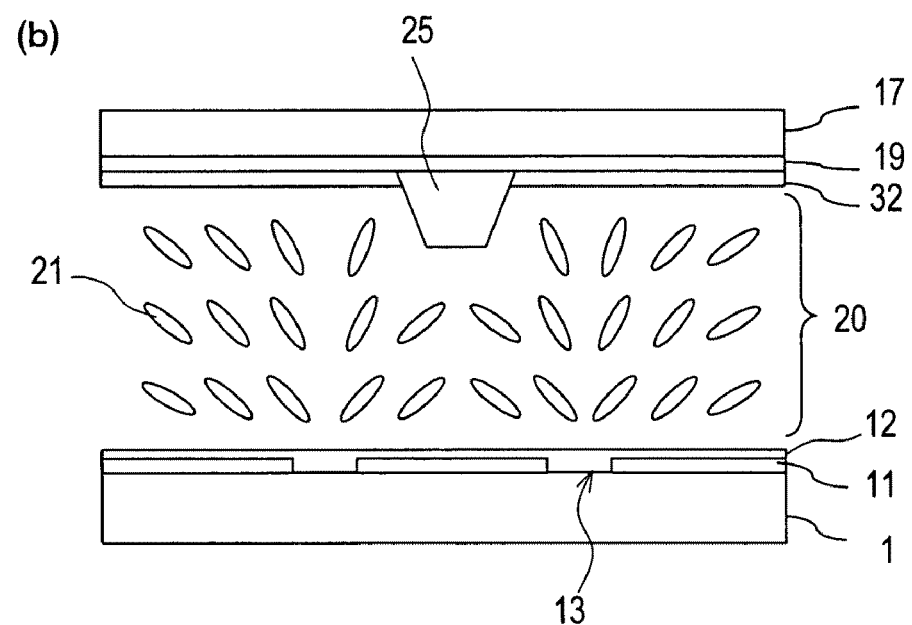

1 Transparent substrate (TFT substrate)
11 Pixel electrode
12, 32 Vertical alignment film
13 Cut portion
17 Transparent substrate (counter (CF) substrate)
19 Counter electrode
20 Liquid crystal layer
21 Liquid crystal molecules
25 Protrusion (dielectric structure)
50r, 50s Liquid crystal panel
40, 43 Polarizing plate
41, 44 ¼ wave plate
42, 45 Phase place negative in optical anisotropy (NR plate)
100 Liquid crystal display apparatus
110a Active matrix substrate
110b Counter substrate (color filter substrate)
111 Pixel electrode
113 Electrode cut portion
116 Reflection layer having a concave/convex shape
117 Transparent insulating layer
125 Protrusion
130 Color filter layer
131 Counter electrode
132 Black matrix
133 Support
200 Transflective liquid crystal display apparatus
210a Active matrix substrate
210b Counter substrate (color filter substrate)
211 Pixel electrode
213 Reflection layer
214 Sub-pixel range defining frame
225 Protrusion (dielectric structure)
216 Transparent insulating layer
230 Color filter layer
231 Counter electrode
232 Black matrix
233 Support
234 Transparent dielectric layer (step in reflection portion)

BEST MODE FOR CARRYING OUT THE INVENTION

Hereinafter, the configuration of a liquid crystal display apparatus of an embodiment of the present invention will be described with reference to the relevant drawings.

First, with reference to FIGS. 1 and 2, a basic mechanism of formation of radially tilted orientation in a liquid crystal display apparatus of an embodiment of the present invention will be described.

Figure 2:
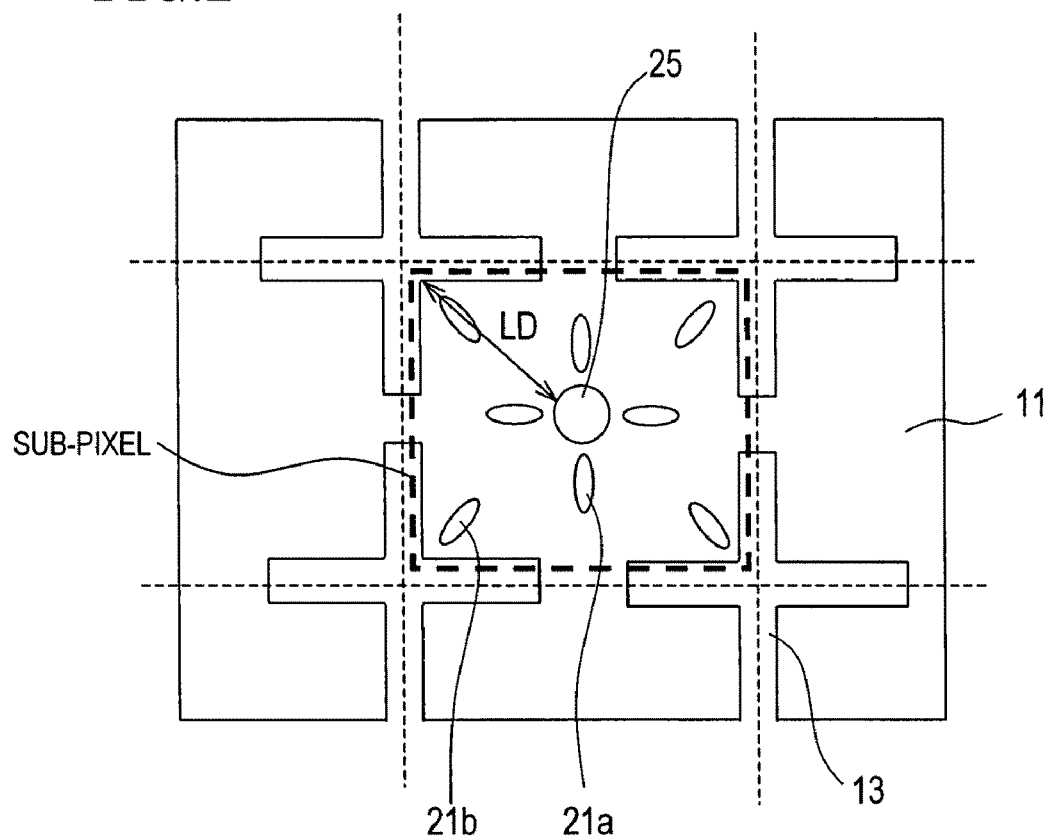
FIG. 2 A schematic view illustrating the operation principle of a liquid crystal display apparatus of an embodiment of the present invention, which is a plan view showing an aligned state of liquid crystal molecules during voltage application.

FIG. 1 illustrates the action of alignment regulating force of cut portions formed on a pixel electrode 11, in which (a) and (b) diagrammatically show the aligned states of liquid crystal molecules during non-voltage application and during voltage application, respectively. FIG. 1(b) shows the state displaying a halftone. FIG. 2 is a view of the aligned state of liquid crystal molecules in a halftone display state as observed from the direction normal to the substrate (plan view). Openings may otherwise be formed in place of the cut portions 13, and in this case, also, substantially the same effect will be obtained.

The liquid crystal display apparatus shown in FIG. 1 includes a pixel electrode 11 having the cut portions 13 and a vertical alignment film 12 formed in this order on a transparent substrate 1. A counter electrode 19, a protrusion 25 and a vertical alignment film 32 are formed in this order on the other transparent substrate 17. Although simplified in FIG. 1, the vertical alignment film 32 is formed to cover the protrusion 25. A liquid crystal layer 20 interposed between the two substrates includes liquid crystal molecules 21 having negative dielectric anisotropy.

As shown in FIG. 1(a), during non-voltage application, the liquid crystal molecules 21 are aligned roughly vertically to the surfaces of the substrates 1 and 17 under the alignment regulating force of the vertical alignment films 12 and 32.

During voltage application, as shown in FIG. 1(b), the liquid crystal molecules 21 having negative dielectric anisotropy are urged to be vertical in their major axes to a line of electric force. Therefore, the directions in which the liquid crystal molecules 21 fall are defined by oblique electric fields generated around the cut portions 13. When the cut portions 13 have a shape of a cross as shown in FIG. 2, a radially tilted liquid crystal domain is formed in a region substantially surrounded by the cut portions 13. Note that a region in which one liquid crystal domain is formed during voltage application is also called a "sub-pixel" in some cases. In FIG. 2, the region shown by a bold broken line defines a sub-pixel.

In the radially tilted domain, liquid crystal directors are oriented in all directions (azimuth directions in the substrate plane), exhibiting an excellent viewing angle characteristic. The radially tilted orientation as used herein is synonymous with axially symmetric orientation, in which liquid crystal molecules are continuously aligned with no disclination line being formed around the center of the radially tilted orientation (center axis of axially symmetric orientation), and the major axes of the liquid crystal molecules are aligned radially, tangentially and helically. In either case, the radially tilted orientation has components of liquid crystal molecules whose major axes are tilted radially from the center of the orientation (components parallel to oblique electric fields).

The "region substantially surrounded by the cut portions" is not necessarily surrounded completely as long as the alignment regulating force acts on the liquid crystal molecules inside the region continuously forming one liquid crystal domain. In other words, as shown in FIG. 2, the adjacent cut portions 13 may be separated from each other as long as one liquid crystal domain is formed therein.

Although the action of the oblique electric fields formed around the cut portions 13 was described, openings may be formed in place of the cut portions 13. Oblique electric fields will also be generated near such openings, and even near the edges of the pixel electrode 11, to define the directions in which the liquid crystal molecules 21 tilt under the electric fields. In other words, the pixel electrode 11 may just have a shape defined so as to exhibit the alignment regulating force under which a liquid crystal domain having radially tilted orientation is formed in the liquid crystal layer in the voltage applied state. The oblique electric fields generated near the edges of the pixel electrode can be controlled by selecting the outline of the pixel electrode and the shape and/or placement of the cut portions. Also, formation of an opening in the pixel electrode can control an oblique electric field generated near the opening.

As described above with reference to FIGS. 1(a) and 1(b), oblique electric fields generated with the cut portions 13 formed on the pixel electrode 11 cause formation of a liquid crystal domain having radially tilted orientation in a region (sub-pixel) substantially surrounded by the cut portions 13. The liquid crystal display apparatus of this embodiment further has the protrusion (dielectric structure) 25 formed on the surface of the upper substrate 17 facing the liquid crystal layer 20 at a position roughly in the center of the sub-pixel. The radially tilted orientation of the liquid crystal molecules is further stabilized under the alignment regulating force (anchoring effect) of the inclined side face (covered with the vertical alignment film 32) of the protrusion 25 protruding into the liquid crystal layer 20.

As is found from FIG. 1(b), the alignment regulating force of the inclined side face of the protrusion 25 formed on the surface of the second substrate (counter substrate) 17 facing the liquid crystal layer 20 acts to align the liquid crystal molecules 21 in the same directions as the alignment regulating force of the alignment regulating structure (electrode openings and cut portions 13) formed on the first substrate (active matrix substrate) 1, and thus further stabilizes the radially tilted orientation of the liquid crystal molecules 21 in the sub-pixel. Also, since the radially tilted orientation is formed around the protrusion 25 placed at roughly the center of the sub-pixel as the center, the center of the radially tilted orientation can be fixed at or near the protrusion 25.

As described above, the aligned directions of liquid crystal molecules existing mainly in the periphery of the sub-pixel are regulated with the alignment regulating structure (which may be the electrode cut portions 13 and electrode openings) formed on the first substrate 1, and the alignment of liquid crystal molecules existing roughly in the center of the sub-pixel is regulated with the alignment regulating structure (protrusion 25) formed on the second substrate 17. Under such regulation, the liquid crystal molecules 21 are put in radially tilted orientation inside the region substantially surrounded by the alignment regulating structure (cut portions 21) formed on the first substrate 1.

While the alignment regulating force given by the oblique electric fields becomes weaker as the voltage is lower, the alignment regulating force of the inclined side face of the protrusion 25 is independent of the voltage. The protrusion 25 therefore exerts sufficient alignment regulating force even in a halftone display state, defining the directions of tilt of liquid crystal molecules stably. For this reason, the protrusion 25 is preferably formed so that the alignment regulating force thereof covers the entire sub-pixel, as is diagrammatically shown in FIG. 2. In other words, as shown in FIG. 2, the longest distance LD between the protrusion 25 and the cut portions 13 of the pixel electrode 11 (or the outermost ends of the pixel electrode 11) is preferably smaller than the distance up to which the alignment regulating force of the protrusion 25 covers. As a result of various examinations, the longest distance LD is found preferably 25 μm or less.

The shape of the protrusion 25 may be determined appropriately depending on the shape of the pixel electrode 11. The cross section of the protrusion 25 along the substrate plane of the substrate 17 can be of a roughly perfect circle, a rough ellipse, a rough rectangle (including a rough square), a rough cross and the like.

(Reflection Region)

Figure 3:
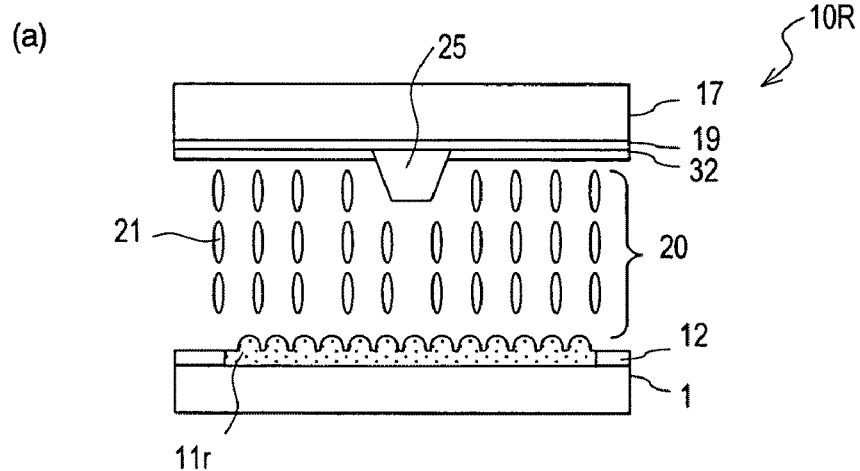
Figure 3:
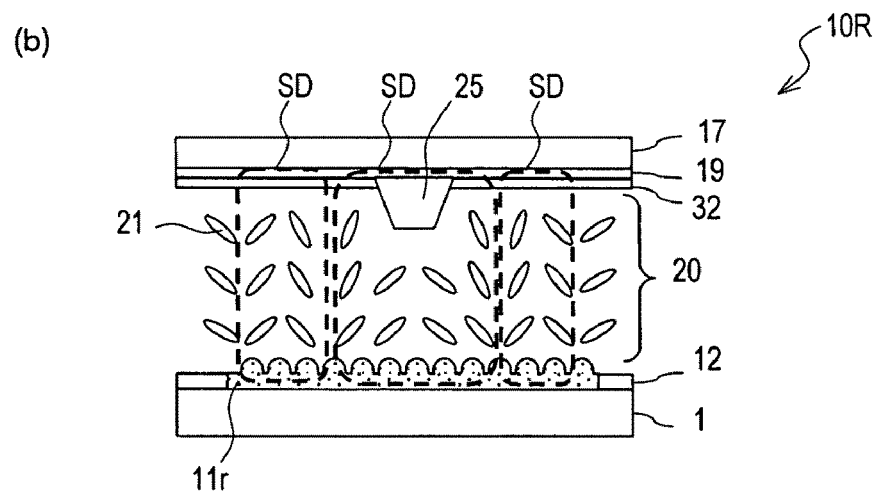
Figure 3:
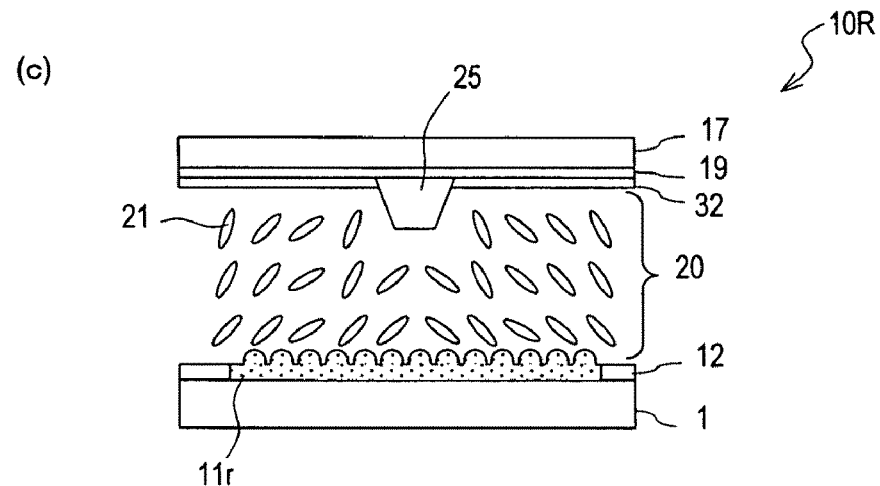

Referring to FIGS. 3(a) to 3(c), why a transient afterimage occurs in a vertically aligned liquid crystal display apparatus 10R including a reflection electrode (pixel electrode) 11r having a concave/convex surface, as those disclosed in Patent Literature 6 and Patent Literature 7, will be described. FIGS. 3(a), 3(b) and 3(c) respectively diagrammatically show the aligned state during non-voltage application, the aligned state after a lapse of two or three seconds from immediately after voltage application and the aligned state in a stable state after a lapse of a sufficient time from the voltage application.

During non-voltage application, as shown in FIG. 3(a), the liquid crystal molecules 21 are roughly vertically aligned under the alignment regulating force of the vertical alignment film 12 on the concave/convex surface of the reflection electrode 11r and the vertical alignment film 32 on the counter electrode 19. Although omitted in the figures, the entire surface of the reflection electrode 11r is covered with the vertical alignment film 12, whose surface reflects the concave/convex shape of the reflection electrode 11r. During this time, the liquid crystal molecules 21 tilt (pre-tilt), even though slightly, under the influence of the concave/convex surface. The pre-tilt direction varies with the position on the concave/convex surface.

Since the concave/convex surface of the reflection electrode 11r also act to regulate the aligned directions of the liquid crystal molecules 21 (directions in which the liquid crystal molecules tilt during voltage application), a number of minute liquid crystal domains SD are formed in the pixel immediately after voltage application as shown in FIG. 3(b).

As the voltage application continues, the minute domains SD are fused into a target radially tilted domain formed under the alignment regulating force of the protrusion 25 (SD in the center in FIG. 3(b)), forming one stable liquid crystal domain as shown in FIG. 3(c).

The process of a number of minute domains being fused into a target radially tilted domain as described above normally requires two to three seconds, and is recognized as a transient afterimage.

Next, the configuration and operation of a liquid crystal display apparatus of an embodiment of the present invention will be described with reference to FIGS. 4(a) and 4(b). FIGS. 4(a) and 4(b) respectively diagrammatically show the aligned state during non-voltage application and the aligned state during voltage application.

Figure 4:
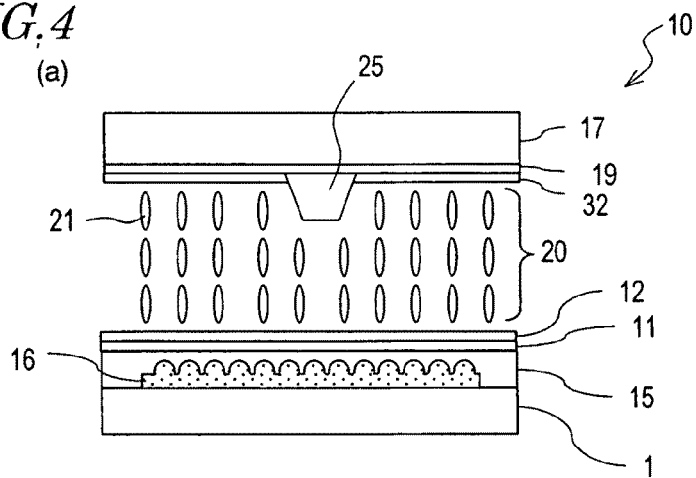
Figure 4:
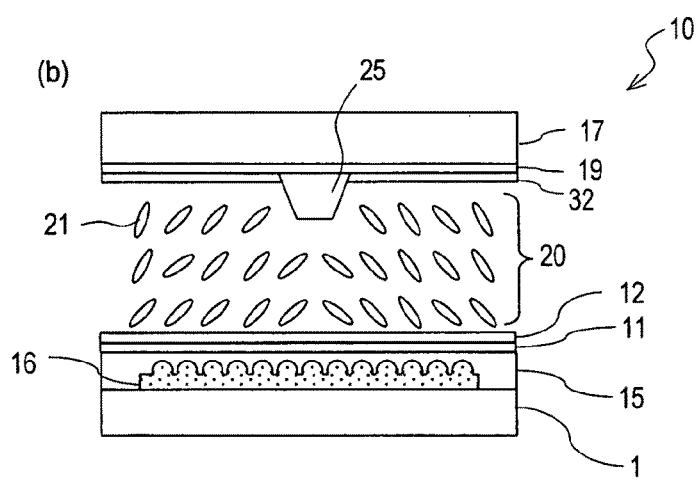

The liquid crystal display apparatus 10 shown in FIG. 4 includes an insulating layer 15 formed to cover a reflection layer 16 having a concave/convex surface, and the pixel electrode 11 is formed on the insulating layer 15. The insulating layer 15, made of a resin layer, for example, has a thickness large enough to absorb the concave/convex portions on the surface of the reflection layer 16 and has a flat surface. Considering that the concave/convex portions are about 0.3 µm to 1.2 µm high, the thickness of the insulating layer 15 is preferably in the range of 2 µm to 5 µm inclusive. The insulating layer 15 and the pixel electrode 11 are preferably transparent. Ambient light passing through the pixel electrode 11 and the insulating layer 15 is reflected from the concave/convex surface of the reflection layer 16 in a predetermined angle range (diffuse reflection), to permit display in the reflection mode.

The surface of the pixel electrode 11 is substantially flat and thus the surface of the vertical alignment film 12 formed thereon is also substantially flat. The orientation of the liquid crystal molecules 21 is therefore regulated with the alignment regulating force of the protrusion 25 and oblique electric fields generated near the edges of the pixel electrode 11. Thus, the vertically aligned state is exhibited during non-voltage application as shown in FIG. 4(a), and a radially tilted domain with the protrusion 25 as the center is formed during voltage application as shown in FIG. 4(b).

The present invention is widely applicable to liquid crystal display apparatuses having a reflection region adapted to display in the reflection mode. In other words, the present invention is applicable, not only to reflective liquid crystal display apparatuses, but also to transmissive/reflective (transflective) liquid crystal display apparatuses adapted to both display in the reflection mode and display in the transmission mode. In the case of transflective application, the thickness of the liquid crystal layer in a reflection region is preferably made smaller than the thickness of the liquid crystal layer in a transmission region. Also, at least one radially tilted domain is preferably formed in each of the reflection region and the transmission region, and a protrusion is preferably formed on the surface of the counter substrate facing the liquid crystal layer at roughly the center of each radially tilted domain.

(Placement of Optical Compensation Films)

Figure 5:
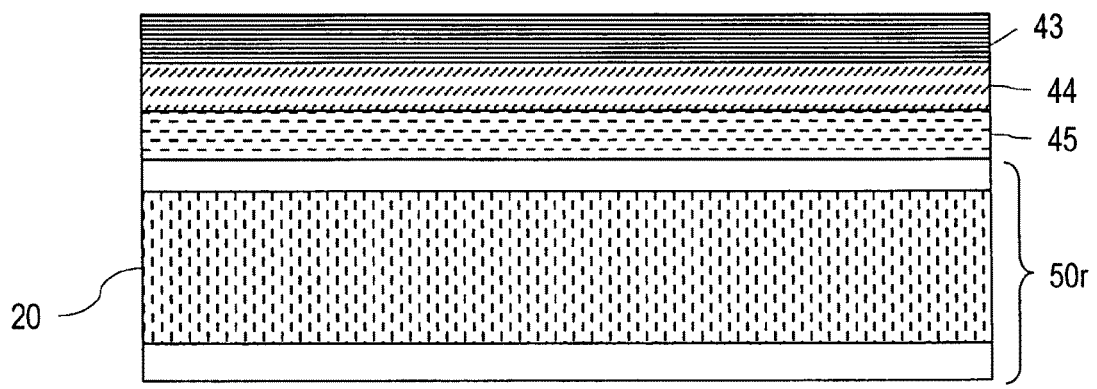
FIG. 5 A diagrammatic cross-sectional view of a reflective liquid crystal display apparatus provided with optical compensation films of an embodiment of the present invention.

Next, referring to FIG. 5, an exemplary configuration of optical compensation films used for a reflective liquid crystal display apparatus of an embodiment of the present invention will be described. FIG. 5 is a diagrammatic cross-sectional view of the reflective liquid crystal display apparatus provided with optical compensation films.

The liquid crystal display apparatus shown in FIG. 5 includes a reflective liquid crystal panel 50r, a polarizing plate 43 placed on the observer side of the reflective liquid crystal panel 50r, a ¼ wave plate 44 placed between the polarizing plate 43 and the liquid crystal panel 50r and a phase plate 45 negative in optical anisotropy placed between the ¼ wave plate 44 and the liquid crystal panel 50r. The liquid crystal panel 50r is the same in configuration as the liquid crystal display apparatus 10 shown in FIG. 4, for example. Alternatively, it may be the same in configuration as a liquid crystal display apparatus 100 to be described later with reference to FIG. 7.

The display operation of the liquid crystal display apparatus shown in FIG. 5 will be briefly described.

In the reflection mode display, incident light from above becomes linearly polarized light after passing through the polarizing plate 43. The linearly polarized light then becomes circularly polarized light when entering the ¼ wave plate 44 arranged so that the angle between the transmission axis of the polarizing plate 43 and the retardation axis of the ¼ wave plate 44 is 45°. The circularly polarized light then passes through a color filter layer (not shown) formed on the counter substrate. Note that the phase plate 45 that is negative in optical anisotropy gives no phase difference for light incident from the normal direction.

During non-voltage application, in which liquid crystal molecules in the liquid crystal layer 20 are aligned roughly vertically to the substrate plane, the incident light is transmitted with the phase difference being roughly 0, and is reflected from the reflection layer formed on the lower substrate 1. The reflected circularly polarized light passes again through the liquid crystal layer 20 and then the color filter layer, and passes through the phase plate 45 negative in optical anisotropy again as the circularly polarized light, to reach, via the ¼ wave plate 44, the polarizing plate 43 as linearly polarized light having a polarizing direction orthogonal to the polarizing direction observed when the incident light first passed through the polarizing plate 43. The light therefore fails to pass through the polarizing plate 43, exhibiting black display.

During voltage application, in which liquid crystal molecules in the liquid crystal layer 20 tilt from the normal to the substrate plane, the incident circularly polarized light becomes elliptically polarized light due to birefringence of the liquid crystal layer 20, and then is reflected from the reflection layer formed on the lower substrate 1. The reflected light further changes its polarized state in the liquid crystal layer 20, and passes again through the liquid crystal layer 20, the color filter layer and then the phase plate 45 negative in optical anisotropy, to be incident on the ¼ wave plate 44 as the elliptically polarized light. Accordingly, when reaching the polarizing plate 43, the light is not linearly polarized light orthogonal to the polarizing direction observed when the light was first incident and thus passes through the polarizing plate 43. In other words, by adjusting the applied voltage, the tilt state of the liquid crystal molecules is controlled, and thus the amount of reflected light that can pass through the polarizing plate 43 is modulated, to thereby permit grayscale display.

Figure 6:
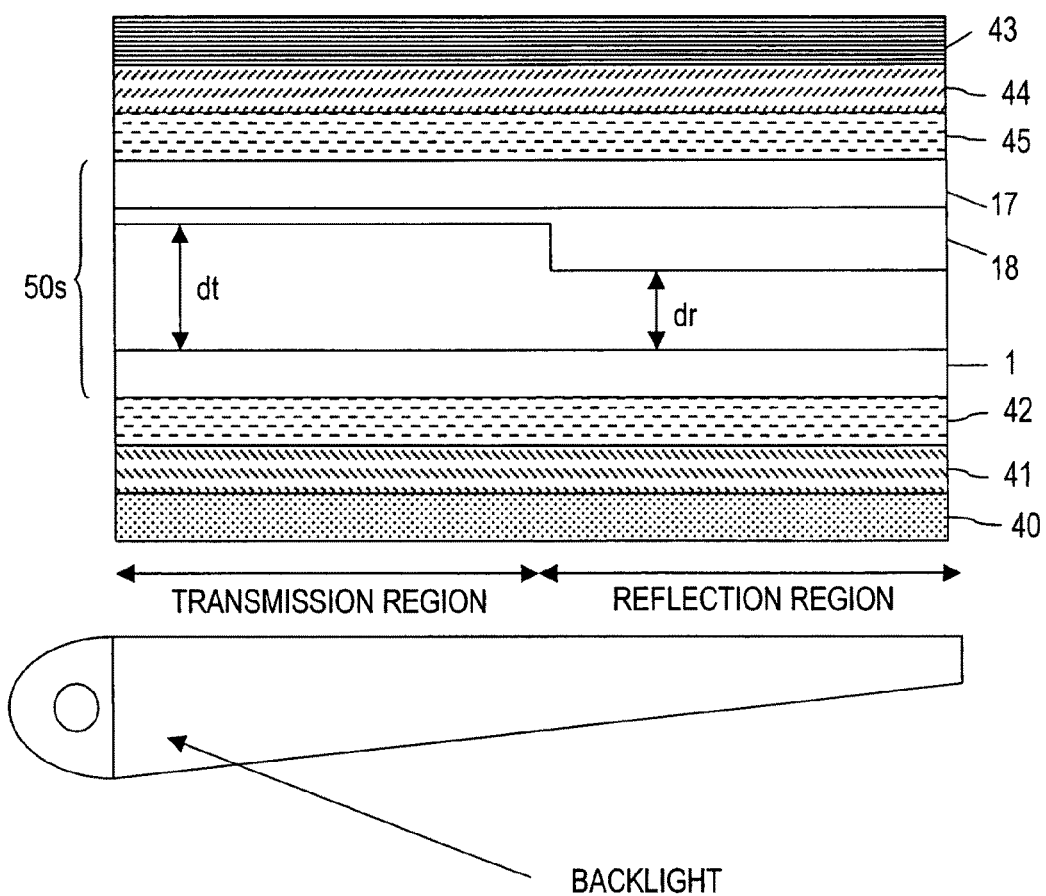
FIG. 6 A diagrammatic cross-sectional view of a transflective liquid crystal display apparatus provided with optical compensation films of an embodiment of the present invention.

Next, the display operation of a transflective liquid crystal display apparatus will be briefly described with reference to FIG. 6. FIG. 6 is a diagrammatic cross-sectional view of a transflective liquid crystal display apparatus provided with optical compensation films of an embodiment of the present invention. The liquid crystal display apparatus shown in FIG. 6 includes a transflective liquid crystal panel 50s in place of the reflective liquid crystal panel 50r in FIG. 5. Also, a backlight is provided for transmission display.

Since the display operation in the reflection mode of a reflection display section (reflection region) in FIG. 6 is as described above, the display operation in the transmission mode of a transmission display section (transmission region) will be described hereinafter.

Two upper and lower polarizing plates 43 and 40 are placed so that the transmission axes thereof are orthogonal to each other. Light outputted from the backlight (light source) becomes linearly polarized light via the polarizing plate 40. The linearly polarized light then becomes circularly polarized light when entering a ¼ wave plate 41 placed so that the angle between the transmission axis of the polarizing plate 40 and the retardation axis of the ¼ wave plate 41 is 45°. The circularly polarized light then passes through a phase plate 42 negative in optical anisotropy to be incident on the transmission display section (transmission region) of the lower substrate 1. Note that the phase plate 42 gives no phase difference to light incident from the normal direction.

During non-voltage application, in which liquid crystal molecules in the liquid crystal layer 20 are aligned roughly vertically to the substrate plane, the incident light is transmitted with the phase difference being roughly 0, and is incident on the lower substrate 1 as circularly polarized light. The light then passes through the liquid crystal layer 20, the upper substrate 17 and then the upper phase plate 45 negative in optical anisotropy as circularly polarized light, to reach the ¼ wave plate 44. The upper and lower ¼ wave plate 44 and 41 are arranged so that the retardation axes thereof are orthogonal to each other. Therefore, in the transmitted polarized light, a phase difference produced in the lower ¼ wave plate 41 can be canceled in the upper ¼ wave plate 44, resuming the original linearly polarized light. The polarized light having passed through the upper ¼ wave plate 44, which is the same linearly polarized light as that having passed through the polarizing plate 40, is absorbed by the polarizing plate 43 whose transmission axis is orthogonal to that of the polarizing plate 40, exhibiting black display.

During voltage application, in which liquid crystal molecules in the liquid crystal layer 20 tilt from the normal to the substrate plane, the incident circularly polarized light becomes elliptically polarized light due to the birefringence of the liquid crystal layer 20, and passes through the upper CF substrate 17, the upper phase plate 45 negative in optical anisotropy and then the ¼ wave plate 44 as elliptically polarized light, to reach the polarizing plate 43. Accordingly, the light is not linearly polarized light orthogonal to the polarized component observed when the light was first incident, and thus passes through the polarizing plate 43. In other words, by adjusting the applied voltage, the tilt state of the liquid crystal molecules is controlled, and thus the amount of transmitted light that can pass through the polarizing plate 43 is modulated, to thereby permit grayscale display.

The phase plate negative in optical anisotropy minimizes the amount of change in phase difference occurring when the angle of view is changed in the vertically aligned state of liquid crystal molecules, and suppresses "black floating" that may occur when observed at a wide angle. In place of the combination of the negative phase plate and the ¼ wave plate, a biaxial phase plate obtained by integrating a phase plate negative in optical anisotropy with a ¼ wave plate may be used. To attain optical compensation over a wide wavelength band, a layered structure of a ½ wave plate and a ¼ wave plate may be used in place of the ¼ wave plate.

In the case of implementing the normally black mode, in which black display is exhibited during non-voltage application while white display is exhibited during voltage application, using radially tilted domains as in the present invention, an extinction pattern caused by a polarizing plate can be removed to improve the brightness by placing a pair of ¼ wave plates on the upper and lower side of a liquid crystal display apparatus (liquid crystal panel). When implementing the normally black mode using radially tilted domains with the upper and lower polarizing plates being placed so that their transmission axes are orthogonal to each other, it is possible in principle to attain substantially the same level of black display as that obtained with a pair of polarizing plates placed under crossed nicols. Thus, a significantly high contrast ratio can be attained, and also a wide viewing angle characteristic derived from the all-directional alignment can be achieved.

(Reflective Liquid Crystal Display Apparatus)

The configuration of a reflective liquid crystal display apparatus 100 of an embodiment of the present invention will be described.

Figure 7:
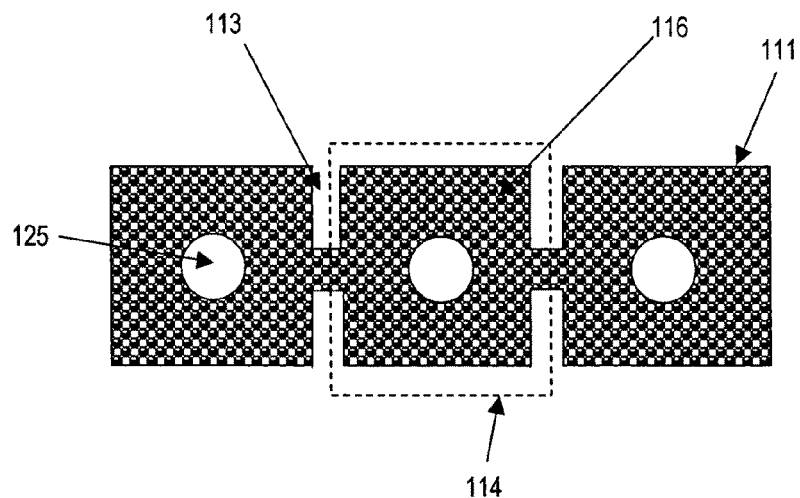
Figure 7:
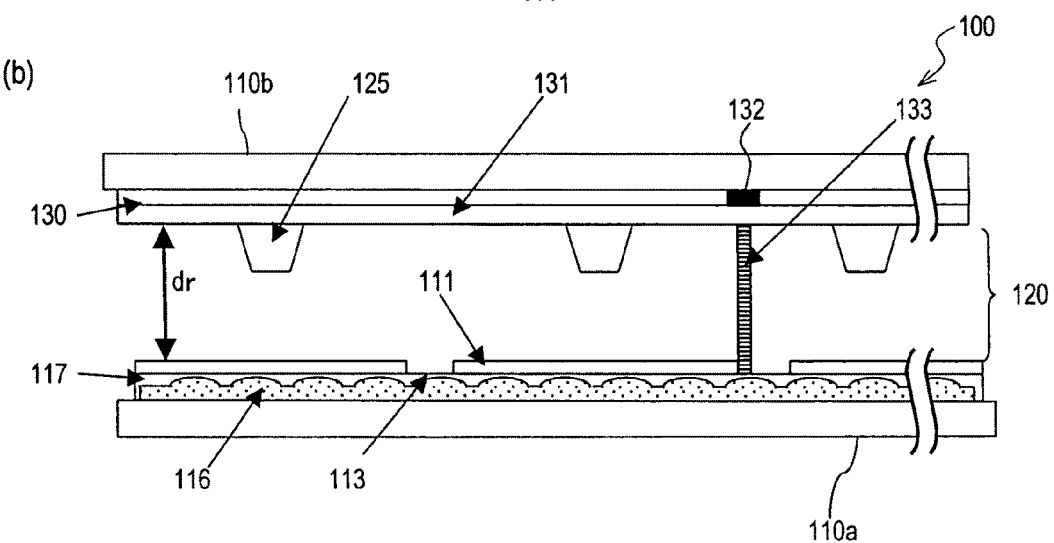

FIG. 7 diagrammatically shows a configuration of one pixel of the reflective liquid crystal display apparatus 100 of an embodiment of the present invention, in which (a) is a plan view and (b) is a cross-sectional view. Note that while FIG. 7(a) shows a configuration of forming three sub-pixels in one pixel, FIG. 7(b) shows a configuration of forming two sub-pixels in one pixel.

The liquid crystal display apparatus 100 includes a substrate (e.g., glass substrate) 110a, a transparent substrate 110b placed to face the substrate 110a, and a vertically aligned liquid crystal layer 120 placed between the substrates 110a and 110b. Vertical alignment films (not shown) are placed on the surfaces of the substrates 110a and 110b facing the liquid crystal layer 120, so that liquid crystal molecules of the liquid crystal layer 120 are aligned roughly vertically to the surface of the vertical alignment films during non-voltage application. The liquid crystal layer 120 includes a nematic liquid crystal material negative in dielectric anisotropy and, as required, a chiral agent.

The liquid crystal display apparatus 100 also includes a reflection layer 116, a transparent insulating layer 117 and a pixel electrode 111 formed on the substrate 110a and a counter electrode 131 formed on the transparent substrate 110b. The pixel electrode 111, the counter electrode 131 and the liquid crystal layer 120 located therebetween define a pixel. Circuit elements such as TFTs are formed on the substrate 110a. The substrate 110a and the components formed thereon are sometimes collectively called an active matrix substrate 110a.

On the surface of the substrate 110b facing the liquid crystal layer 120, typically formed are a color filter 130 provided for each pixel (a plurality of color filters are sometimes collectively called a color filter layer 130 as a whole) and a black matrix (light-shading layer) 132 provided between adjacent color filters 130, that is, between adjacent pixels. The counter electrode 131 is formed over these components. Alternatively, the color filter layer 130 and the black matrix 132 may be formed on the counter electrode 131 (on the surface thereof facing the liquid crystal layer 120). The substrate 110b and the components formed thereon are sometimes collectively called a counter substrate (color filter substrate) 110b.

The pixel electrode 111 is formed of a transparent conductive layer made of ITO and the like. A region located above the reflection layer 116 defines a reflection region. The reflection layer 116 is formed of an Al layer, an alloy layer containing Al or a multilayer film including any of these layers. The surface of the reflection layer 116 has a concave/convex shape, with which incident light can be reflected at various angles, permitting while display close to paper white. The transparent insulating layer 117 is formed over the reflection layer 116 to flatten the concave/convex surface of the reflection layer 116. As a result, the concave/convex shape of the reflection layer 116 is prevented from affecting the directions in which liquid crystal molecules fall.

The pixel electrode 111 has cut portions 113 formed at predetermined positions, to divide the pixel into three sub-pixels with the cut portions 113. Once a predetermined voltage is applied across the liquid crystal layer 120, a liquid crystal domain having radially tilted orientation is formed in each of the three sub-pixels under the alignment regulating force of oblique electric fields generated in the periphery of the pixel electrode 111 and near the cut portions 113.

Also, protrusions 125 are formed on the surface of the substrate 110b facing the liquid crystal layer 120 so as to be located at roughly the center of the respective sub-pixels. With the alignment regulating force of the protrusions 125, the orientation of the liquid crystal domains is stabilized. With the protrusion 125 located roughly at the center of each sub-pixel, the center of the orientation of the liquid crystal domain can be fixed at roughly the center of the sub-pixel, and thus the probabilities of existence of liquid crystal molecules aligned in all directions can be made roughly equal to one another. This can reduce the variation in reflectance with pixels when viewed in a slant direction and thus enables uniform display free from roughness. Although FIG. 7 shows an example of forming three liquid crystal domains in one reflection region, the present invention is not limited to this. The shape of each liquid crystal domain is preferably a rough square from the standpoint of the viewing angle characteristic and the alignment stability.

A support 133 for defining the thickness of the liquid crystal layer 120 (also called the cell gap) is preferably formed in the light-shading region because the display quality will not be lowered at this position. The support 133 can be formed by photolithography using a photosensitive resin, for example, and may be formed on either the substrate 110a or 110b. The support 133, placed at a predetermined position using a photosensitive resin, is also called a photo spacer or a columnar spacer.

Although omitted in the above description, the liquid crystal display apparatus 100 further includes a pair of polarizing plates placed to face each other via the substrates 110a and 110b. The pair of polarizing plates are typically placed so that the transmission axes thereof are orthogonal to each other. Also, as described earlier, biaxial phase plates or uniaxial phase plates may be provided.

Figure 8:
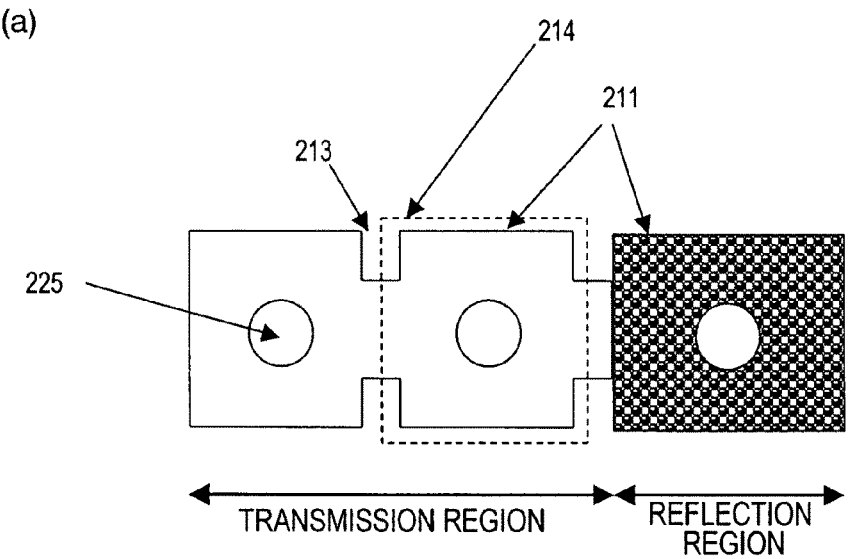
Figure 8:
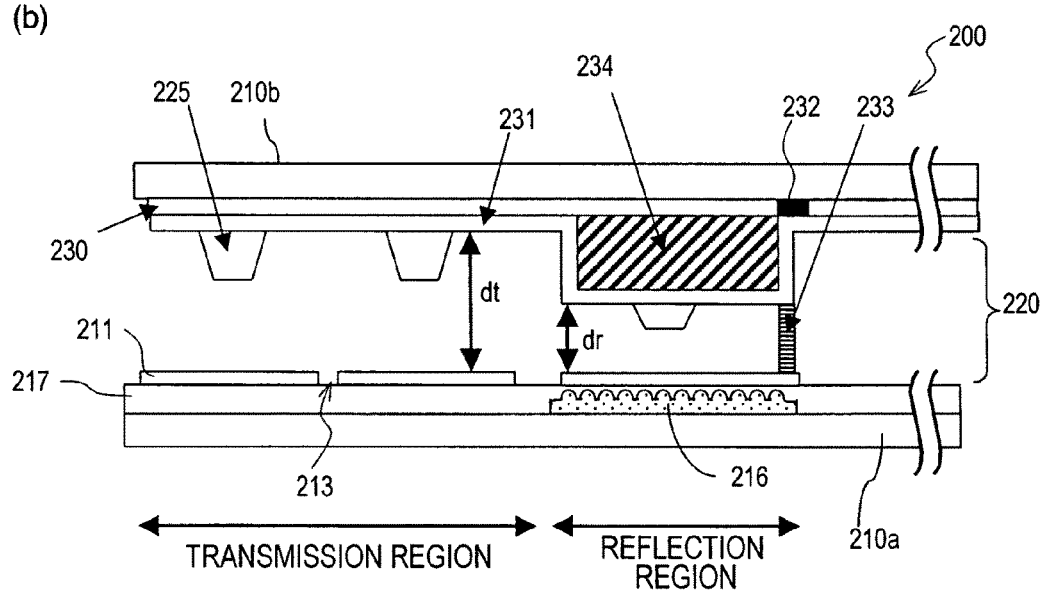

Next, referring to FIG. 8, a preferred configuration specific to a transflective liquid crystal display apparatus 200 permitting both display in the transmission mode and display in the reflection mode will be described. FIG. 8 diagrammatically shows a configuration of one pixel of the transflective liquid crystal display apparatus 200 of an embodiment of the present invention, in which (a) is a plan view and (b) is a cross-sectional view.

The transflective liquid crystal display apparatus 200 includes a substrate (e.g., glass substrate) 210a, a transparent substrate 210b placed to face the substrate 210a, and a vertically aligned liquid crystal layer 220 placed between the substrates 210a and 210b. Vertical alignment films (not shown) are placed on the surfaces of the substrates 210a and 210b facing the liquid crystal layer 220, so that liquid crystal molecules of the liquid crystal layer 220 are aligned roughly vertically to the surface of the vertical alignment films during non-voltage application. The liquid crystal layer 220 includes a nematic liquid crystal material negative in dielectric anisotropy and, as required, a chiral agent.

The transflective liquid crystal display apparatus 200 also includes a reflection layer 216, a transparent insulating layer 217 and a pixel electrode 211 formed on the substrate 210a and a counter electrode 231 formed on the transparent substrate 210b. The pixel electrode 211, the counter electrode 231 and the liquid crystal layer 220 located therebetween define a pixel. On the surface of the substrate 210b facing the liquid crystal layer 220, typically formed are a color filter 230 provided for each pixel (a plurality of color filters are sometimes collectively called a color filter layer 230 as a whole) and a black matrix (light-shading layer) 232 provided between adjacent color filters 230, that is, between adjacent pixels. The counter electrode 231 is formed over these components. Alternatively, the color filter layer 230 and the black matrix 232 may be formed on the counter electrode 231 (on the surface thereof facing the liquid crystal layer 220).

The pixel electrode 211 is formed of a transparent conductive layer made of ITO and the like. A region located above the reflection layer 216 defines a reflection region, and the remaining region defines a transmission region. The reflection layer 216 is formed of an Al layer, an alloy layer containing Al or a multilayer film including any of these layers. The surface of the reflection layer 216 has a concave/convex shape, with which incident light can be reflected at various angles, permitting while display close to paper white. The transparent insulating layer 217 is formed over the reflection layer 216 to flatten the concave/convex surface of the reflection layer 216. As a result, the concave/convex shape of the reflection layer 216 is prevented from affecting the directions in which liquid crystal molecules fall.

While light used for display passes through the liquid crystal layer 220 twice in the reflection mode, it passes through the liquid crystal layer 220 only once in the transmission mode. Therefore, as diagrammatically shown in FIG. 8(b), the thickness dt of the liquid crystal layer 220 in the transmission region A is preferably set about twice as large as the thickness dr of the liquid crystal layer 220 in the reflection region B. With this setting, retardations imparted to light by the liquid crystal layer 220 in the two display modes can be made roughly equal to each other. It is most preferred to set dt=0.5 dr, but good display can be attained in the two display modes as long as 0.3 dt<dr<0.7 dt is satisfied. Naturally, dt=dr may be acceptable depending on the use.

In the liquid crystal display apparatus 200, a transparent dielectric layer 234 is formed on the substrate 210b in the reflection region B to make the thickness of the liquid crystal layer 220 in the reflection region B smaller than the thickness of the liquid crystal layer in the transmission layer A. The counter electrode 231 is preferably formed to cover the transparent dielectric layer 234 (i.e., on the surface thereof facing the liquid crystal layer 220) as illustrated. By adopting this configuration of forming the transparent dielectric layer 234 on the counter substrate 210b, it is unnecessary to provide a step under the pixel electrode 211 in the reflection region using an insulating film and the like, and thus the fabrication of the active matrix substrate 210a can advantageously be simplified.

Part of the pixel electrode 211 may be used as a reflection electrode and a concave/convex shape may be given to the surface thereof to attain white display close to paper white. However, as described above, the radially tilted orientation may not be stabilized with this configuration. Therefore, as in the case of the reflective liquid crystal display apparatus described above, the reflection layer 216 having a concave/convex shape is formed in the reflection region, the transparent insulating layer 214 is formed over the reflection layer 216, and the transparent pixel electrode 211 is formed on the transparent insulating layer 214, so that the reflection layer 216 will not impede formation of radially tilted orientation above the pixel electrode 211 in the reflection region. In the illustrated example, four cut portions 213 are provided at positions that will divide the pixel electrode 211 into three equal parts in the length direction, and three protrusions 225 are provided on the surface of the counter substrate 210b facing the liquid crystal layer 220, to form three radially tilted domains (sub-pixels) in the pixel. The positions of the cut portions 213 may be determined appropriately depending on the number and size of sub-pixels.

While light used for display passes through the color filter layer 230 only once in the transmission mode, it passes through the color filter layer 230 twice in the reflection mode. Therefore, if color filters having the same optical density are used in the transparent region A and the reflection region B, the color purity and/or the luminance in the reflection mode may decreases. To suppress occurrence of this problem, the optical density of the color filter layer in the reflection region is preferably made smaller than that of the color filter layer in the transmission region. The optical density as used herein refers to a characteristic value characterizing the color filter layer, which can be reduced by reducing the thickness of the color filter layer. Alternatively, the optical density may be reduced by reducing the density of a pigment to be added while keeping the thickness of the color filter layer unchanged.

Hereinafter, the display characteristics of a prototype liquid crystal display apparatus will be described in a concretive manner.

Example 1

Figure 9:
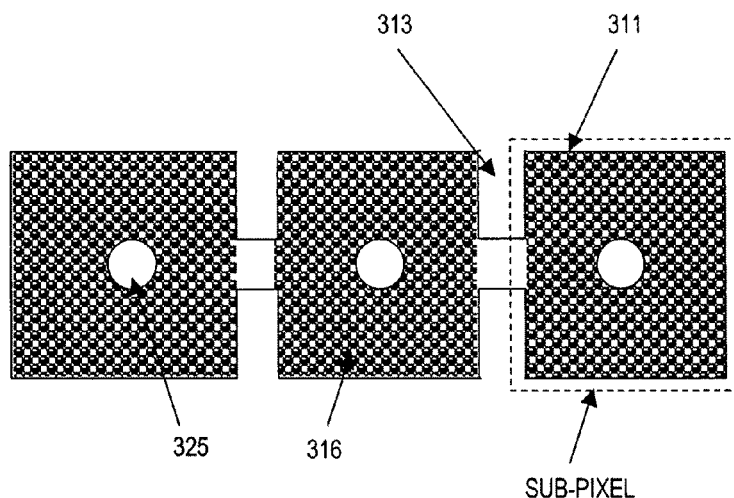
Figure 9:
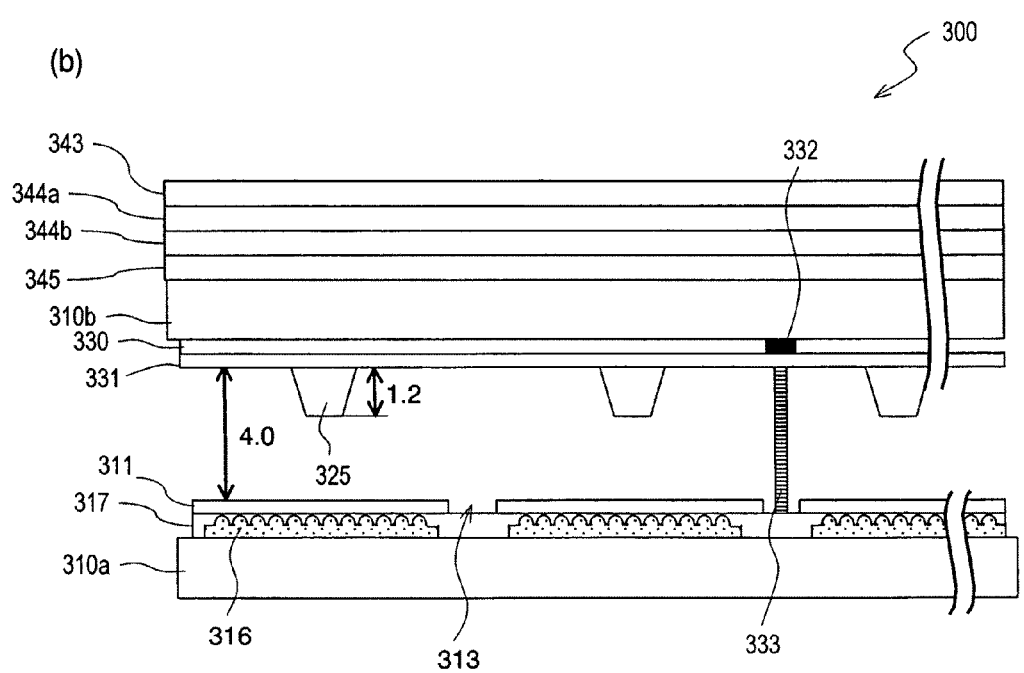

A reflective liquid crystal display apparatus 300 shown in FIGS. 9(a) and 9(b) were prototyped. FIG. 9 diagrammatically shows a configuration of one pixel of the liquid crystal display apparatus 300 of Example 1, in which (a) is a plan view and (b) is a cross-sectional view. Note that while FIG. 9(a) shows a configuration of forming three sub-pixels in one pixel, FIG. 9(b) shows a configuration of forming two sub-pixels in one pixel.

A resin layer (preferably, a photoresist layer) was formed on an active matrix substrate that has signal lines and thin film transistors (TFTs) already formed thereon, and using a mask having a pattern of 6 μm dia. circles arranged randomly, a pattern of a number of columns was formed in a region corresponding to the pixel electrode 311. The formed columns were then deformed into a hemispherical shape by heating. An Al layer was formed on the resultant concave/convex shaped resin layer (not shown) by vapor deposition, and the resultant layer was patterned to correspond to pixel electrodes, to thereby obtain a reflection layer 316. Subsequently, a transparent insulating layer having a thickness of about 3 μm was formed to cover the reflection layer 316, to flatten the concave/convex surface of the reflection layer 316. A pixel electrode (ITO layer; transparent electrode) 311 was formed on the flattened surface by vapor deposition and patterning (see FIG. 9(b)). Cut portions 313 were formed at predetermined positions of the pixel electrode 311 to divide the pixel into a plurality of sub-pixels. In the configuration shown in FIG. 9(a), four cut portions 313 are formed at positions that will divide the pixel electrode 311 into three equal parts in the length direction. In the configuration shown in FIG. 9(b), cut portions 313 are formed at positions that will divide the pixel into two equal parts in the length direction. The positions of the cut portions 313 may be determined appropriately depending on the number and size of sub-pixels.

Also, protrusions 325 were formed on the surface of a counter substrate (color filter substrate) 310b facing the liquid crystal layer on which a color filter layer 330, a black matrix 332 and a counter electrode 331 were formed. The protrusions 325 were placed to be roughly in the center of the respective sub-pixels. The height of the protrusions 325 was set at 1.2 μm. A support 333 for defining the cell thickness, whose height was set at 4.0 μm, was placed outside the pixel region.

A vertical alignment agent was applied to the thus-fabricated active matrix substrate 310a and counter substrate 310b and then baked to form vertical alignment layers (not shown) on the substrates. The resultant active matrix substrate 310a and counter substrate 310b were bonded together, and a liquid crystal material having negative dielectric anisotropy ($\Delta n=0.101$, $\Delta \epsilon=-5.0$) was injected into a space between the substrates and sealed, to thereby fabricate a liquid crystal display apparatus. Optical compensation films were then placed on both outer sides of the substrates constituting the liquid crystal display apparatus, to complete the liquid crystal display apparatus.

As shown in FIG. 9(b), the liquid crystal display apparatus of this example has a layered structure including, from above (observer side) in order, a polarizing plate 343, a ½ wave plate 344a, a ¼ wave plate 344b, a phase plate (NR plate) 345 negative in optical anisotropy and the liquid crystal layer (having the color filter substrate on the upper side and the active matrix substrate on the lower side). The angle between the transmission axis of the polarizing plate 343 and the retardation axis of the ½ wave plate 344a was set at 15°, and the angle between the retardation axis of the ½ wave plate 344a and the retardation axis of the ¼ wave plate 344b was set at 60°, so that the combination of the ½ wave plate 344a and the ¼ wave plate 344b could function as a wide-band ¼ wave plate.

The phase plate 345 negative in optical anisotropy was set to have a phase difference of 135 nm in the directions parallel with the optical axis (vertical to the film plane) and the film plane. Note that the azimuth angle of the transmission axis of the polarizing plate with respect to the substrate is not specifically defined in this example because liquid crystal molecules are aligned in all directions.

Figure 10:
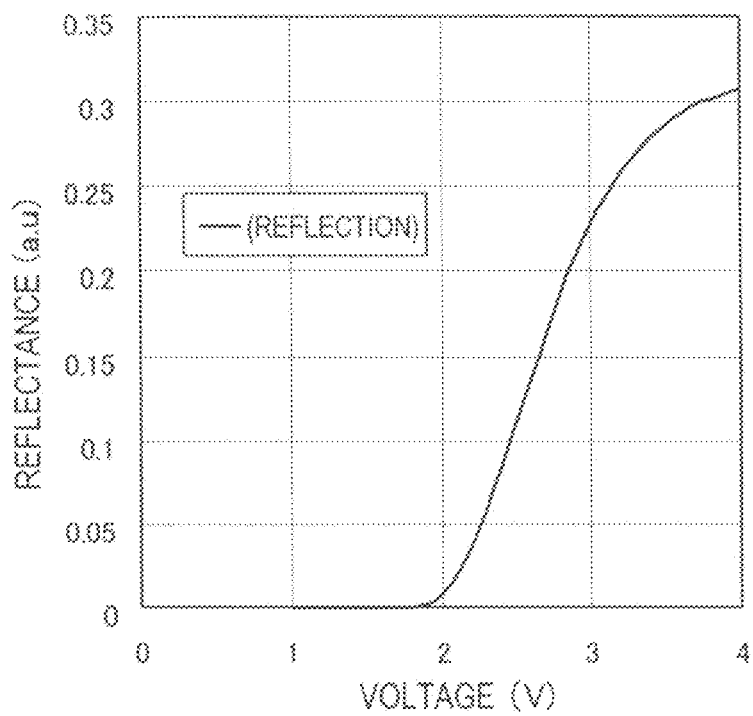
Figure 10:
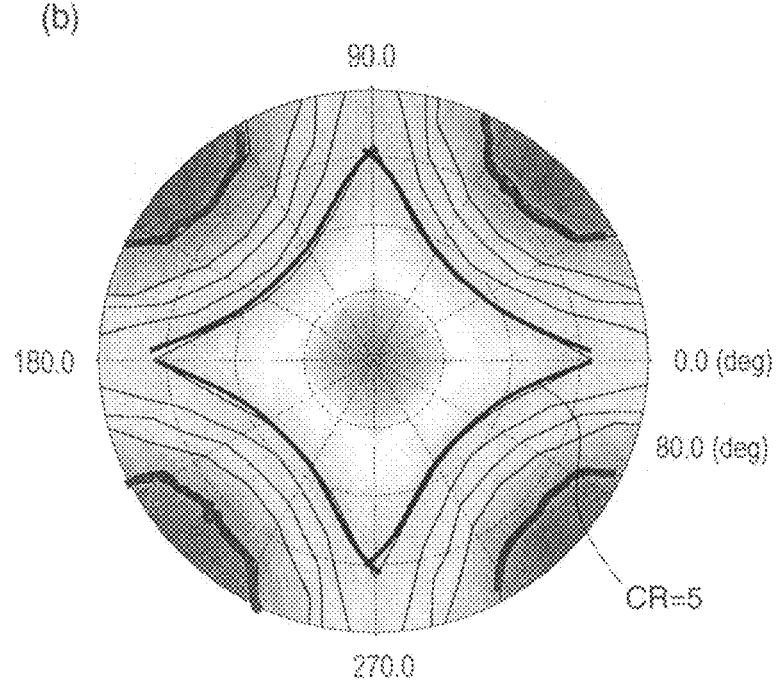

A drive signal was applied to the liquid crystal display apparatus 300 to evaluate the display characteristics. As a result, a good voltage-reflectance characteristic was exhibited as shown in FIG. 10(a). FIG. 10(b) shows the angle of view—contrast characteristic results in reflection display. The viewing angle characteristic in reflection display was found roughly all-directional and symmetrical, the region of CR>5 was as wide as ±40°, and the reflection contrast was as high as 25:1 or more in the front. As for the response characteristic, no afterimage was recognized when display was switched from a black-and-white checked pattern to an all-black pattern. Good display was therefore permitted.

Example 2

Transflective Liquid Crystal Display Apparatus

Figure 11:
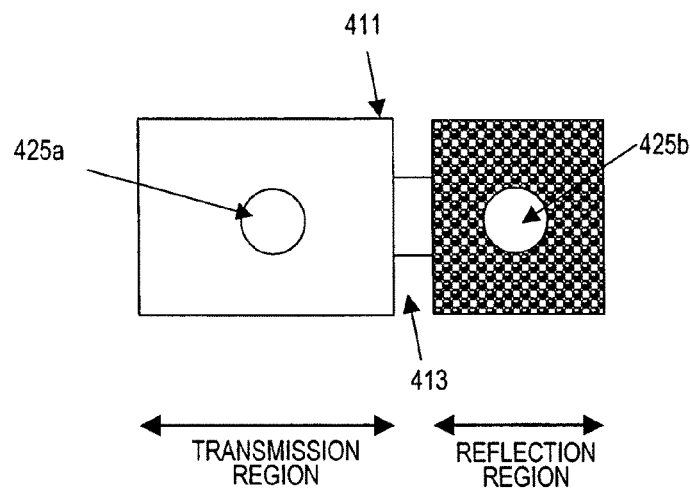
Figure 11:
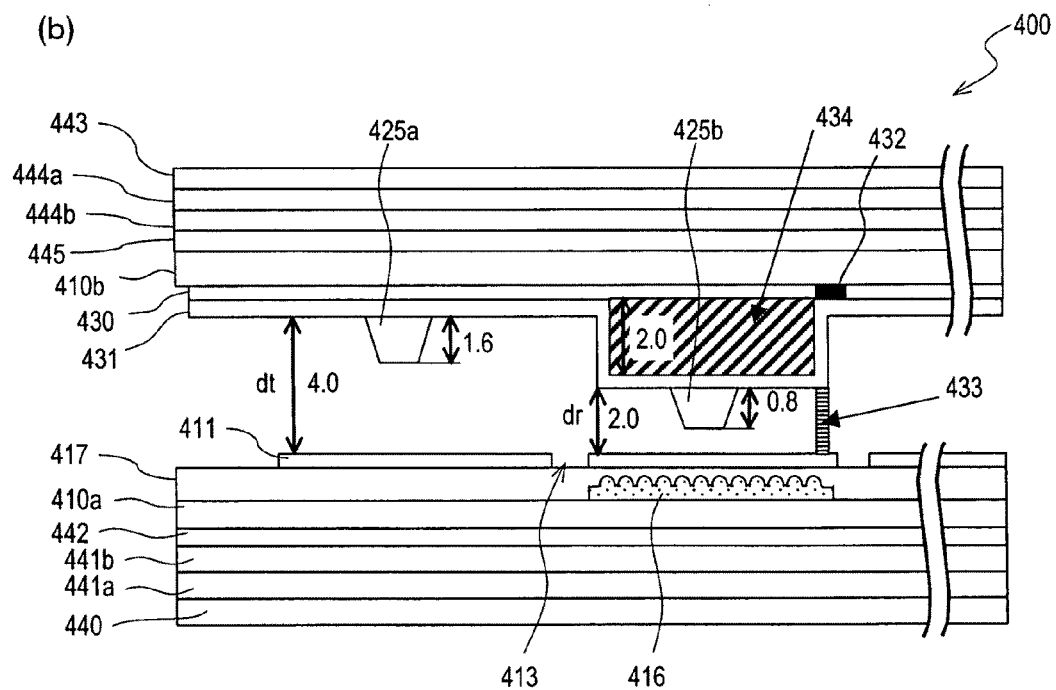

A transflective liquid crystal display apparatus 400 shown in FIGS. 11(a) and 11(b) were prototyped. FIG. 11 diagrammatically shows a configuration of one pixel of the liquid crystal display apparatus 400 of Example 2, in which (a) is a plan view and (b) is a cross-sectional view.

First, as in Example 1, a resin layer having a concave/convex shape was selectively formed by photolithography in a portion of a pixel region of an active matrix substrate 410a that is to become a reflection region. Thereafter, a reflection layer 416 was formed on the concave/convex shaped resin layer, and then an insulating layer 417 was formed covering the reflection layer 416 to flatten the concave/convex shape. A transparent pixel electrode 411 was formed on the flat surface of the insulating layer 417.

The outline of the pixel electrode 411 was as shown in FIG. 11(a), in which two cut portions 413 were formed to divide the pixel electrode into two sub-pixels corresponding to a transmission region and the reflection region, and liquid crystal molecules were radially tilted in each region.

A color filter layer 430 and a black matrix 432 were formed on a counter substrate 410b as in Example 1, and thereafter, a transparent dielectric layer 434 having a thickness that makes the thickness (cell gap) dr of the liquid crystal layer in the reflection region half the thickness dt of the liquid crystal layer in the transmission region. In this example, the cell gap in the transmission region was set at 4.0 µm, and the thickness of the transparent dielectric layer 434 was set at 2.0 µm. After the formation of the transparent dielectric layer 434, a counter electrode 431 was formed. Protrusions 425a and 425b were then formed on the counter electrode 431 at positions roughly in the center of the sub-pixels. The height of the protrusion 425a in the transparent region was set at 1.6 µm, while the height of the protrusion 425b in the reflection region was set at 0.8 µm. A support 433 for defining the cell gap had a height of 2.0 µm and placed outside the display region. As illustrated, the support 433 was made to stand at a position adjoining the transparent dielectric layer 434.

Subsequent process steps were performed as described in Example 1, to fabricate the transflective liquid crystal display apparatus. Note however that the optical compensation films were set differently.

As shown in FIG. 11(b), the optical compensation films in the liquid crystal display apparatus of this example had a layered structure including, from above (observer side) in order, a polarizing plate 443, a ½ wave plate 444a, a ¼ wave plate 444b, a phase plate (NR plate) 445 negative in optical anisotropy, a liquid crystal layer (having the color filter substrate on the upper side and the active matrix substrate on the lower side), a phase plate (NR plate) 442 negative in optical anisotropy, a ¼ wave plate 441b, a ½ wave plate 441a and a polarizing plate 440. The retardation axes of the ¼ wave plates 444b and 441b located above and below the liquid crystal layer were made orthogonal to each other, and the phase difference thereof was set at 140 nm (visible light (¼ of 560 nm). The retardation axes of the ½ wave plates 444a and 441a located above and below the liquid crystal layer were made orthogonal to each other, and the phase difference thereof was set at 280 nm (visible light (½ of 560 nm). The angle between the transmission axis of the polarizing plate (440 or 442) and the retardation axis of the ½ wave plate (441a or 444a) was set at 15°, and the angle between the retardation axis of the ½ wave plate (441a or 444a) and the retardation axis of the ¼ wave plate (441b or 444b) was set at 60°, so that the combination of the ½ wave plate (441a or 444a) and the ¼ wave plate (441b or 444b) could function as a wide-band ¼ wave plate (441b or 444b) (the wave plates on the same side with respect to the liquid crystal layer are combined).

The phase plates 442 and 445 negative in optical anisotropy were set to have a phase difference of 135 nm in the directions parallel with the optical axis (vertical to the film plane) and the film plane. The two polarizing plates (443 on the observer side and 440 on the backlight side) were placed so that their transmission axes are orthogonal to each other.

Figure 12:
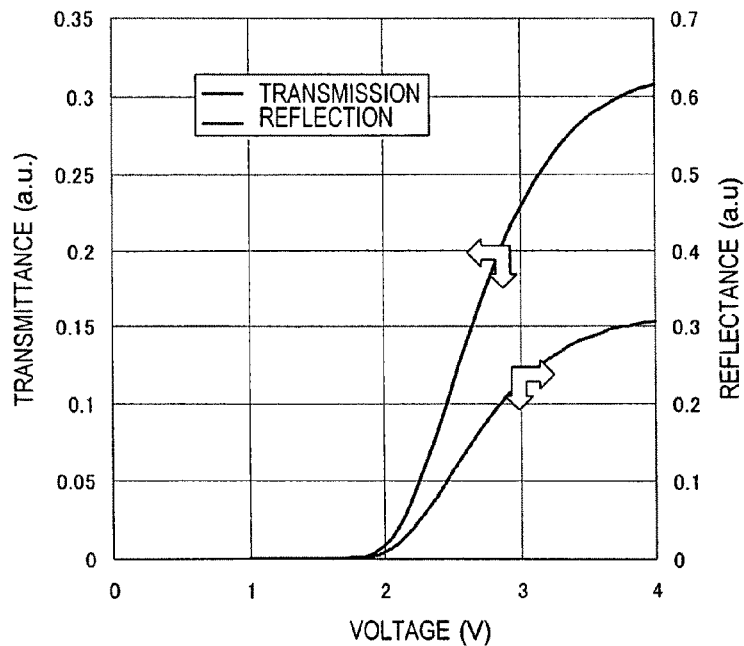
FIG. 12 A voltage-transmittance/reflectance characteristic view of the liquid crystal display apparatus 400 of Example 2.

The display (transmission/reflection) characteristics of the thus-fabricated transflective liquid crystal display apparatus were evaluated. As a result, it was found that good voltage-transmittance/reflectance characteristics were exhibited as shown in FIG. 12. In reflection display, a good viewing angle characteristic was exhibited as in Example 1. As for the response characteristic, also, no afterimage was recognized when display was switched from a black-and-white checked pattern to an all-black pattern. Good display was therefore permitted. In transmission display, also, good characteristics were exhibited as in the reflection display. That is, the angle of view—contrast characteristic was all-directional and symmetrical, and the region of CR>10 was as wide as ±60° or more in the upper, lower, right and left directions. The front contrast was as high as 300:1 or more.

Figure 13:
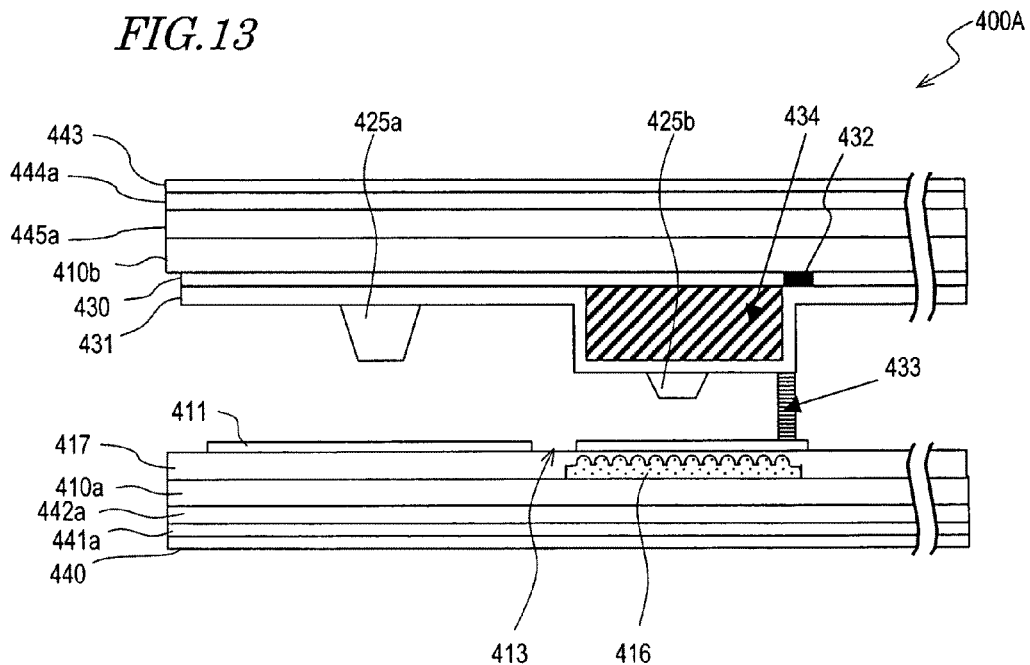
FIG. 13 A cross-sectional view diagrammatically showing a configuration of one pixel of a liquid crystal display apparatus 400A of Example 2.

The combination of the negative uniaxial phase plate (442 or 445) and the ¼ wave plate (441b or 444b) in the liquid crystal display apparatus 400 may be replaced with one biaxial phase plate (442a or 445a), as in a liquid crystal display apparatus 400A shown in FIG. 13. The display characteristics of the liquid crystal display apparatus 400A were mostly the same as those in Example 2 and thus found good. The configuration of the liquid crystal display apparatus 400A is smaller in the number of layers of the optical compensation films, compared with the configuration of the liquid crystal display apparatus 400. This reduces the cost and also minimizes a displacement at film stacking. Therefore, the variation in characteristics is reduced, and thus a liquid crystal display apparatus uniform in quality can be easily fabricated.

Comparative Example 1

A liquid crystal display apparatus was prototyped in which in the active matrix substrate of the liquid crystal display apparatus 300 of Example 1 shown in FIG. 9(a), the reflection layer 316 was used as a pixel electrode, and the insulating layer 317 and the transparent pixel electrode 311 were omitted.

The display characteristics of the liquid crystal display apparatus of this comparative example was evaluated and found that, while the voltage-reflectance characteristic and the angle of view—contrast characteristic were good as in Example 1, a transient afterimage was observed when red, green and blue were sequentially displayed in turn on the entire screen. The pixel response state of this liquid crystal display apparatus was observed with a polarizing microscope. As a result, as described earlier with reference to FIG. 3, it was observed that a number of minute domains were first formed under influence of the concave/convex shape of the reflection electrode and then domains were gradually fused into one. The afterimage was observed due to part of such domains. In contrast, in the liquid crystal display apparatuses of Examples 1 and 2, in which occurrence of minute domains was suppressed, no afterimage was observed.

Example 3

Transflective Liquid Crystal Display Apparatus

Figure 14:
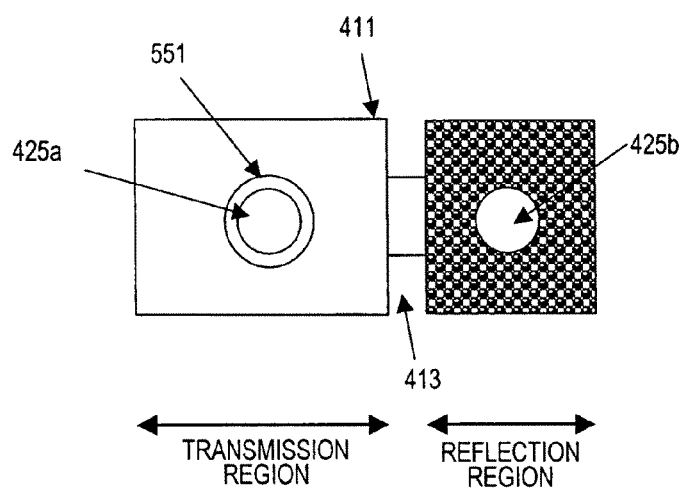
Figure 14:
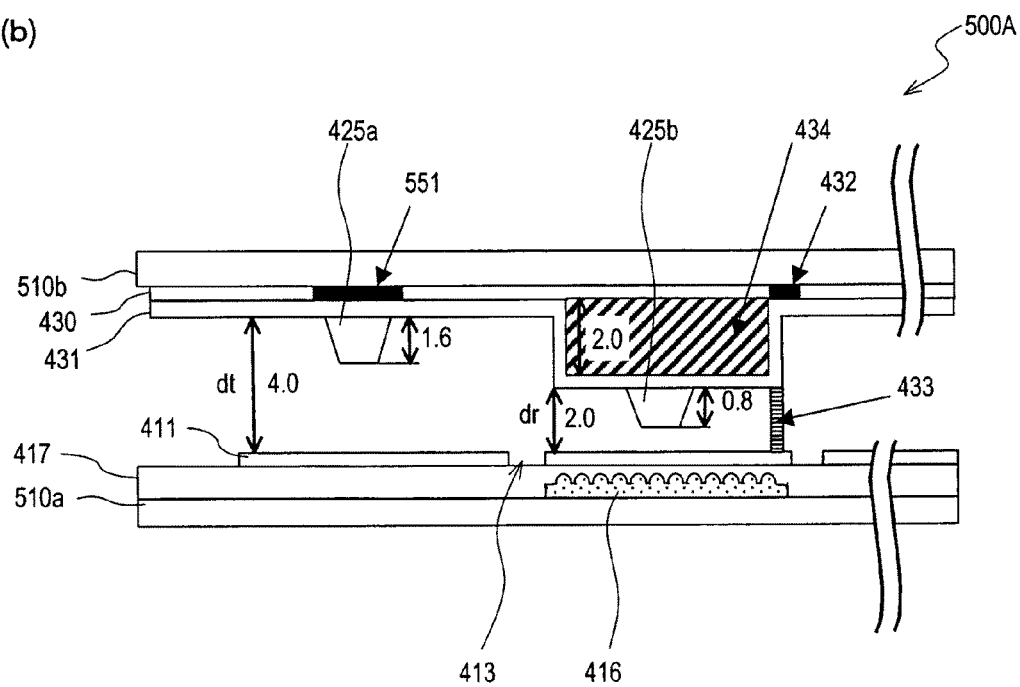
Figure 15:
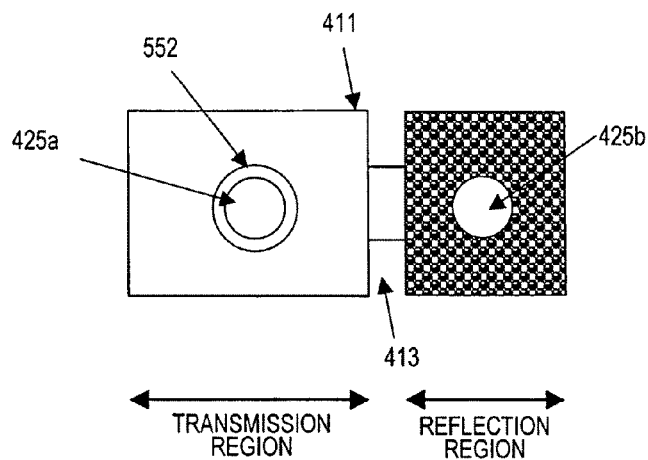
Figure 15:
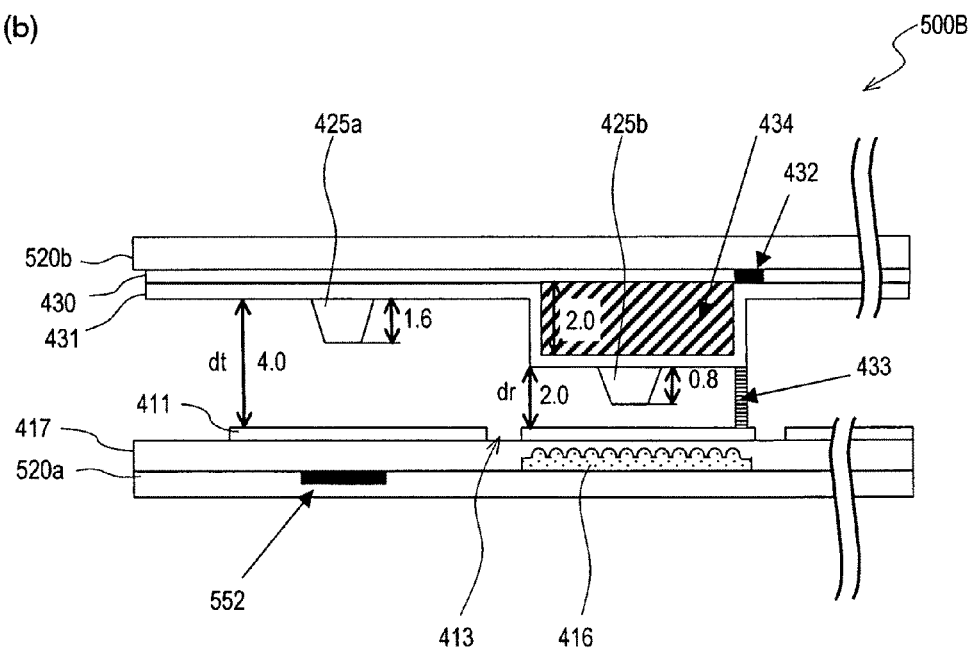

Transflective liquid crystal display apparatuses 500A and 500B shown in FIGS. 14 and 15, respectively, were fabricated. The transflective liquid crystal display apparatuses 500A and 500B are different from the transflective liquid crystal display apparatus 400 of Example 2 in that a light-shading layer 551 or 552 is provided at a position corresponding to the protrusion 425a formed in the transmission region. Common components are denoted by the same reference numerals, and description thereof is omitted for simplification. The configuration of optical compensation films is the same as that of FIG. 11 although not shown.

The transflective liquid crystal display apparatuses 500A and 500B of this example, which have the light-shading layer 551 or 552 at a position corresponding to the protrusion 425a formed in the transmission region, have a contrast ratio equal to or higher than the transflective liquid crystal display apparatus 400. The reason for this will be described.

The protrusion 425a has a face (side face) inclined with respect to the substrate plane. If liquid crystal molecules are aligned vertically to the inclined side face of the protrusion 425a, they will be in a tilt state with respect to the substrate plane (display plane). The vertically aligned liquid crystal layer displays black in the state of liquid crystal molecules being aligned vertically to the substrate plane during non-voltage application. Accordingly, light leakage will occur near the inclined side face of the protrusion 425a. In the case of display of a halftone, also, light leakage will occur if the tilt angle (angle from the normal) of liquid crystal molecules in the area near the inclined side face is greater than the tilt angle of liquid crystal molecules in the other area. Such light leakage will lower the contrast ratio.

In formation of a vertical alignment film (not shown) on the protrusion 425a, the thickness of the portion of the vertical alignment film formed on the protrusion 425a may become thin or non-uniform. In such a case, also, the orientation of liquid crystal molecules may be disturbed, causing light leakage and thus lowering the contrast ratio.

The protrusion-caused problems described above also occur with the protrusion 425b placed in the reflection region. However, since the front contrast of the reflection region is as low as about 20:1 while that of the transmission region is as high as 300:1, the influence of such light leakage on the display will be small even if measures against light leakage is omitted in the reflection region. Naturally, a light-shading layer may also be provided to correspond to the protrusion in the reflection region.

The transflective liquid crystal display apparatuses 500A and 500B of Example 3 has the light-shading layer 551 or 552 to prevent light leakage occurring near the protrusion 425a from adversely affecting the display. Thus, a contrast ratio equal to or higher than that of the liquid crystal display apparatus 400 can be obtained.

Referring to FIGS. 14(a) and 14(b), a specific configuration and fabrication method of the prototyped transflective liquid crystal display apparatus 500A will be described. Note that description of portions common with the transflective liquid crystal display apparatus 400 is omitted.

The black matrix 432 was formed on the counter substrate 510b at a position corresponding to the boundary of adjacent pixels. In the process step of forming the black matrix 432, the light-shading layer 551 was formed in the same layer as the black matrix 432 at a position corresponding to roughly the center of the sub-pixel constituting the transmission region. The light-shading layer 551, which had a shape of a 22 µm-dia. circle, was formed so as to shade the entire protrusion 425a to be formed later when viewed in the direction vertical to the counter substrate 510b. To state specifically, the light-shading layer 551 is placed so that when viewed in the direction vertical to the counter substrate 510b, the center of the light-shading layer 551 roughly agrees with the center of the bottom of the protrusion 425a and the fringe of the light-shading layer 551 coincides or surrounds the fringe of the bottom of the protrusion 425a.

The color filter layer 430 was then formed, and in the reflection region, formed was the transparent dielectric layer 434 having a thickness that makes the thickness (cell gap) dr of the liquid crystal layer in the reflection region half the thickness dt of the liquid crystal layer in the transmission region. In this example, the cell gap in the transmission region was set at 4.0 µm, and the thickness of the transparent dielectric layer 434 was set at 2.0 µm. The counter electrode 431 was formed after the formation of the transparent dielectric layer 434.

The protrusions 425a and 425b were then formed on the counter electrode 431 at positions roughly in the center of the sub-pixels. The protrusion 425a in the transparent region was set to have a height of 1.6 µm and the bottom thereof had a shape of a 20 µm-dia. circle. The protrusion 425b in the reflection region was set to have a height of 0.8 µm and the bottom thereof had a shape of a 20 µm-dia. circle. The protrusion 425a was formed so that the center of the bottom of the protrusion 425a would agree with the center of the light-shading layer 551 as viewed in the direction vertical to the counter substrate 510b. With the diameter of the light-shading layer 551 being 22 µm, the fringe of the bottom of the protrusion 425a was completely surrounded by the fringe of the light-shading layer 551.

The support 433 for defining the cell gap had a height of 2.0 µm and was placed outside the display region. As illustrated, the support 433 was made to stand at a position adjoining the transparent dielectric layer 434.

Thereafter, substantially the same process steps as those for the transflective liquid crystal display apparatus 400 of Example 2 were performed, to obtain the transflective liquid crystal display apparatus 500A.

The thus-fabricated transflective liquid crystal display apparatus 500A, in which the protrusion 425a was completely shaded with the light-shading layer 551, was free from an influence of light leakage near the protrusion 425a and had a front contrast as high as 400:1 or more, which was higher than the front contrast of the liquid crystal display apparatus 400 of Example 2 (300:1 or more) having no such light-shading layer 551.

The light-shading layer 551 may have the same shape as the bottom of the protrusion 425a, and in this case reduction in pixel aperture can be minimized.

Referring to FIGS. 15(a) and 15(b), a specific configuration and fabrication method of the prototyped transflective liquid crystal display apparatus 500B will be described. Note that description of portions common with the transflective liquid crystal display apparatus 400 will be omitted.

The liquid crystal display apparatus 500B has an active matrix substrate 520a and a counter substrate 520b.

In the active matrix substrate 520a that is substantially the same as that in the liquid crystal display apparatus 400, the light-shading layer 552 was formed at a position corresponding to the protrusion 425a in the transmission region. The light-shading layer 552 had a shape of a 22 µm-dia. circle.

The liquid crystal display apparatus 500B could obtain substantially the same contrast ratio and pixel aperture as the liquid crystal display apparatus 500A as long as no displacement occurred in positioning in the process step of bonding the active matrix substrate 520a with the counter substrate 520b. However, when a displacement occurred, the position of the protrusion 425a with respect to the light-shading layer 552 deviated, failing to completely shade the protrusion 425a.

Light leakage was therefore observed, and thus the contrast ratio decreased. Also, reduction in pixel aperture was great compared with the liquid crystal display apparatus 500A. Considering a margin for a displacement in the bonding step, the size of the light-shading layer 552 must be set greater than the light-shading layer 551 in the liquid crystal display apparatus 500A. This reduces the pixel aperture.

INDUSTRIAL APPLICABILITY

As described above, according to the present invention, in a liquid crystal display apparatus forming a liquid crystal domain having radially tilted orientation in a pixel, the orientation of liquid crystal molecules can be sufficiently stabilized to sufficiently improve the response characteristic, whereby high-quality display with occurrence of an afterimage being suppressed can be attained.

The present invention is suitably applied to a reflective liquid crystal display apparatus and a transflective (transmissive/reflective) liquid crystal display apparatus. In particular, the transflective liquid crystal display apparatus is suitably used as a display apparatus for mobile equipment such as mobile phones.

The invention claimed is:

1. A liquid crystal display apparatus comprising:
    a first substrate, a second substrate placed to face the first substrate and a vertically aligned liquid crystal layer placed between the first and second substrates,
    wherein the liquid crystal display apparatus comprises a plurality of pixels each comprising a first electrode formed on the first substrate, a second electrode formed on the second substrate and the liquid crystal layer located between the first and second electrodes,
    the first substrate further comprises a reflection layer having a concave/convex surface and an insulating layer formed to cover the reflection layer, the first electrode being placed on the insulating layer and having a shape defined to exert alignment regulating force with which at least one liquid crystal domain having radially tilted orientation is formed in the liquid crystal layer in a voltage applied state,
    the second substrate has a protrusion protruding toward the liquid crystal layer in a region corresponding to the liquid crystal domain; and
    wherein the second substrate has a color filter layer and a black matrix, and a light-shading layer is formed of the same film as the black matrix, and wherein the light-shading layer shades the protrusion and is spaced from the black matrix.

2. The liquid crystal display apparatus of claim 1, wherein the first electrode has an opening or a cut portion.

3. The liquid crystal display apparatus of claim 1, wherein the insulating layer is transparent.

4. The liquid crystal display apparatus of claim 1, wherein the first electrode is made of a transparent conductive layer.

5. The liquid crystal display apparatus of claim 1, wherein each of the plurality of pixels has a transmission region adapted to display in a transparent mode and a reflection region adapted to display in a reflection mode,
    the reflection region includes a region in which the first electrode overlaps the reflection layer, and the transmission region includes a region in which the first electrode does not overlap the reflection layer, and
    each of the transmission region and the reflection region includes at least one liquid crystal domain having radially tilted orientation in a voltage applied state.

6. The liquid crystal display apparatus of claim 5, wherein the thickness dt of the liquid crystal layer in the transmission region is greater than the thickness dr of the liquid crystal layer in the reflection region.

7. The liquid crystal display apparatus of claim 5, wherein the second substrate further comprises the light-shading layer placed on the side of the protrusion away from the liquid crystal layer, the protrusion being placed in a region corresponding to the liquid crystal domain in the transmission region.

8. The liquid crystal display apparatus of claim 7, wherein the light-shading layer shades the entire of the protrusion when viewed in a direction vertical to the second substrate.

9. The liquid crystal display apparatus of claim 1, further comprising: a pair of polarizing plates placed to face each other via the first and second substrates; and at least one biaxial phase plate between the first substrate and/or the second substrate and the pair of polarizing plates.

10. The liquid crystal display apparatus of claim 1, further comprising: a pair of polarizing plates placed to face each other via the first and second substrates; and at least one uniaxial phase plate between the first substrate and/or the second substrate and the pair of polarizing plates.

* * * * *